(12) United States Patent
Kurihara et al.

(10) Patent No.: US 7,903,370 B2
(45) Date of Patent: Mar. 8, 2011

(54) THIN-FILM MAGNETIC HEAD WITH COIL-INSULATING LAYER THAT THERMAL EXPANSION COEFFICIENT AND YOUNG'S MODULUS ARE SPECIFIED

(75) Inventors: Katsuki Kurihara, Tokyo (JP); Hiraku Hirabayashi, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 889 days.

(21) Appl. No.: 11/757,114

(22) Filed: Jun. 1, 2007

(65) Prior Publication Data

US 2008/0068749 A1   Mar. 20, 2008

(30) Foreign Application Priority Data

Jun. 2, 2006   (JP) .................. 2006-154611

(51) Int. Cl.
*G11B 5/17*   (2006.01)
(52) U.S. Cl. .............................. 360/123.46; 360/123.25
(58) Field of Classification Search ............. 360/123.09, 360/123.16, 123.25, 123.46, 123.15, 123.17, 360/123.38, 123.56, 125.31, 125.74
See application file for complete search history.

(56) References Cited

U.S. PATENT DOCUMENTS

| 5,991,113 | A | 11/1999 | Meyer et al. | |
| 6,836,389 | B2 | 12/2004 | Macken et al. | |
| 7,110,219 | B2 | 9/2006 | Ota | |
| 2004/0240109 | A1* | 12/2004 | Hamann et al. | 360/126 |
| 2005/0068675 | A1* | 3/2005 | Sasaki et al. | 360/126 |
| 2005/0219749 | A1* | 10/2005 | Aoki et al. | 360/126 |
| 2006/0215316 | A1* | 9/2006 | Aoki | 360/126 |

FOREIGN PATENT DOCUMENTS

| JP | 2000-306213 | 11/2000 |
| JP | 2004-30723 | 1/2004 |
| JP | 2004-192665 | 7/2004 |
| JP | 2005-285236 | 10/2005 |

* cited by examiner

*Primary Examiner* — Brian E Miller
*Assistant Examiner* — Adam B Dravininkas
(74) *Attorney, Agent, or Firm* — Oblon, Spivak, McClelland, Maier & Neustadt, L.L.P.

(57) ABSTRACT

A thin-film magnetic head which suppresses the TPTP phenomenon due to the environment temperature is provided. The thin-film magnetic head includes, an electromagnetic coil element having a coil layer and coil-insulating layer, and an overcoat layer. A width of the coil-insulating layer in a track-width direction is larger than a width that is needed to insulate the whole coil layer, and is at least 46 μm, and a length of the coil-insulating layer in a direction perpendicular to the track-width direction is larger than a length that is needed to insulate the whole coil layer, and is at least 75 μm. In addition, a heat expansion coefficient of the coil-insulating layer is larger than or equal to $30\times10^{-6}$/K, and a Young's modulus of the coil-insulating layer is larger than or equal to 1 GPa and smaller than or equal to 4 GPa.

24 Claims, 13 Drawing Sheets

TRAILING SIDE ◄───► LEADING SIDE

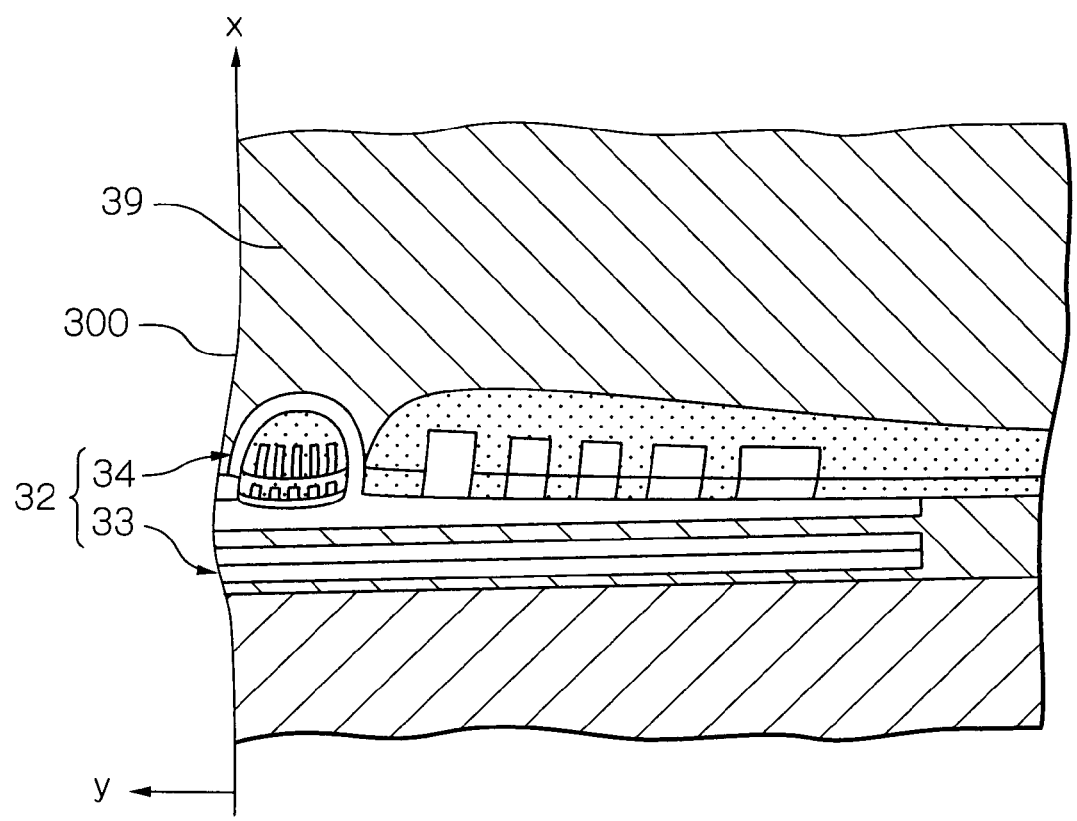

ion coefficient and the Young's modulus of the each protecting layer, the art is not sufficient to suppress the TPTP phenomenon.

THIN-FILM MAGNETIC HEAD WITH COIL-INSULATING LAYER THAT THERMAL EXPANSION COEFFICIENT AND YOUNG'S MODULUS ARE SPECIFIED

PRIORITY CLAIM

This application claims priority from Japanese patent application No. 2006-154611, filed on Jun. 2, 2006, which is incorporated herein by reference.

BACKGROUND OF THE INVENTION

1. Field of the Invention

The present invention relates to a thin-film magnetic head for magnetic recording equipped an electromagnetic coil element with a coil layer and a coil-insulating layer, a head gimbal assembly (HGA) with the thin-film magnetic head, and a magnetic disk drive apparatus with the HGA.

2. Description of the Related Art

A thin-film magnetic head which a magnetic disk drive apparatus comprises flies with a predetermined spacing (flying height) above a rotating magnetic disk which is a magnetic recording medium, in writing or reading signals. The thin-film magnetic head, on flying state, writes data to the magnetic disk using write magnetic field generating from an electromagnetic coil element, and reads data with sensing a signal field from the magnetic disk using a magnetoresistive (MR) effect element.

With higher recording density due to increasing data storage capacity in recent years, a track width of the thin-film magnetic head is becoming smaller. In order to avoid a degradation of writing and reading performance due to the smaller track width, an effective magnetic distance $d_M$ is becoming smaller, which is a distance between an edge of the magnetic head element composed of the electromagnetic coil element and the MR effect element, and a surface of the magnetic disk. The magnetic distance $d_M$ is actually reduced down to approximately 10 nm or less.

In case of applying write currents to the electromagnetic coil element in the magnetic head element, a temperature of the magnetic head element increases by Joule heat, eddy current loss heat, and so on. Also, by heat from other parts in the magnetic disk drive apparatus, the temperature of the magnetic head element may also increase with a temperature rise of inside of the magnetic disk drive apparatus according to an external use environment.

With a rise of "an environment temperature" that is a temperature without actively controlling by a heat from inside or outside of the magnetic head element, a so-called thermal pole tip protrusion (TPTP) phenomenon, that an end of the magnetic head element protrudes to a magnetic disk surface direction, occurs. Actually, in the magnetic head element, a write coil layer formed of a conductive metal material such as Cu, a magnetic pole layer formed of a magnetic metal material, and a write coil-insulating layer formed of a plastic material such as photo-resist hold the most of its volume, whereas, a whole overcoat layer of the magnetic head element is formed of insulation material such as alumina ($Al_2O_3$). In this case, a heat expansion coefficient of the metal material and a heat expansion coefficient of plastic material are two to three times and ten times larger than that of the insulation material, respectively. As a result, the large TPTP phenomenon occurs by a large difference of heat expansion coefficient between the magnetic head element and the overcoat layer.

In the case where the effective distance $d_M$ is a minute value as described above, there is likely to contact the protruded end of the magnetic head element with the surface of the magnetic disk. This contact might cause a problem (thermal asperity) that abnormal signals occur with a change of an electrical resistance value of the MR effect element by a friction heat in this contact. Furthermore, a danger of crush raises up.

The art for avoiding these problems is described, which controls the effective distance $d_M$ by actively using the TPTP phenomenon with providing the heating element in the thin-film magnetic head (for example, U.S. Pat. No. 5,991,113). This art designs the effective distance $d_M$ in prospect of the protrusion by a mount of heat of the heating element beforehand, and adjusts the effective distance $d_M$ by the amount of current flow to the heating element in driving. However, in case of adjusting the effective distance $d_M$ by using the heating element in this way, it is necessary to lower a degree of the TPTP phenomenon as much as possible according to the environment temperature that has difficulty with control.

As a way of suppressing the TPTP phenomenon due to the environment temperature, for example, U.S. Pat. No. 6,836,389 describes the magnetic head having an expansion joint with low Young's modulus between a final layer which contains a converter and a substrate. In this head, the expansion joint absorbs an expansion transformation of the final layer and the substrate. Also, U.S. Pat. No. 7,110,219 describes the art which solves a head crush problem with suppressing protrusion of the overcoat layer by forming a heating block layer which is a lower thermal conductivity in the overcoat layer. Furthermore, Japanese patent Publication No. 2000-306213A insists that the magnetic head is obtained, which does not occur a transformation increasing the danger of crush by providing a higher Young's modulus layer on the side of a flying surface of an upper protecting layer or a lower protecting layer and a lower Young's modulus layer on its rear.

Furthermore, US patent Publication No. 2005/0219749A describes a decreasing the TPTP phenomenon by regulating a volume of the insulating layer surrounding the write coil layer to a predetermined value for a thickness of a protecting layer. That is to say, although the art described in U.S. Pat. No. 6,836,389, U.S. Pat. No. 7,110,219 and, Japanese patent Publication No. 2000-306213A, use a particular component which consists of a special material, US patent Publication No. 2005/0219749A takes relatively easy measure.

However, in the above-described arts, the problem that the suppression of the TPTP phenomenon with environment temperature is not sufficient has occurred in same cases.

For example, as the art described in U.S. Pat. No. 6,836,389, it needs to be equivalent the heat expansion coefficient of basecoat to that of the metal layer which the converter contains, then it has a restriction to select a material. Further, the measure for the expansion transformation of the basecoat or the overcoat by the heat from the converter is not sufficient. Also, in U.S. Pat. No. 7,110,219, although it is possible to suppress the protrusion of the overcoat layer by the existence of the heating block layer, it is difficult to suppress the protrusion of the magnetic head element.

Further, in Japanese patent Publication No. 2000-306213A, as ranges of the size of the each protecting layer and the Young's modulus are not disclosed at all, it is difficult surely to suppress the TPTP phenomenon. In fact, as the protrusion of TPTP phenomenon is the order of one nanometer (nm) to ten nanometers, it is necessary to regulate the size of the each protecting layer and the Young's modulus in order to control and suppress such a minute volume. Further, as the ranges of these values affects the value of the heat expansion coefficient of the each protecting layer, in the art which has not a specific regulation about the heat expansion coefficient, it becomes difficult surely to suppress the TPTP phenomenon.

Such situation is similar to the art described in US patent Publication No. 2005/0219749A. Surely, although this art, which does not use a new particular component, takes easy measure relative to the art described in Japanese patent Publication No. 2000-306213A, it only regulates the volume of the insulating layer surrounding the write coil layer, but it does not concretely disclose the possible range of the Young's modulus or the heat expansion coefficient of insulating layer. In fact, the only regulation of the volume of the insulating layer is not sufficient for surely suppressing the TPTP phenomenon.

BRIEF SUMMARY OF THE INVENTION

Therefore, it is an object of the present invention to provide a thin-film magnetic head which surely suppresses the TPTP phenomenon due to an environment temperature not using a new particular component, a HGA equipped the thin-film magnetic head, and a magnetic disk drive apparatus equipped the HGA.

Here, some terms will be defined before explaining the present invention. In a layered structure of elements formed on an element-formed surface of the slider substrate, a component that is closer to the element-formed surface than a standard layer is defined to be "below" or "lower" in relation to the standard layer, and a component that is in the stacking direction side of the standard layer is defined to be "above" or "upper" in relation to the standard layer.

According to the present invention, a thin-film magnetic head is provided, which includes, an electromagnetic coil element for writing data with a coil layer which generates magnetic field by current flowed in its own and a coil-insulating layer which surrounds the coil layer; and an overcoat layer formed in such a way as to cover the electromagnetic coil element, a width of a track-width direction of the coil-insulating layer being larger than a width that is a minimum width to need to insulate the whole coil layer, and being at least 46 μm, a length of a direction perpendicular to the track-width direction of the coil-insulating layer being larger than a length that is a minimum length to need to insulate the whole coil layer, and being at least 75 μm, a heat expansion coefficient of the coil-insulating layer being larger than or equal to $30 \times 10^{-6}$/K, and a Young's modulus of the coil-insulating layer being larger than or equal to 1 GPa and smaller than or equal to 4 GPa.

If the size, the heat expansion coefficient, and the Young's modulus of the coil-insulating layer are regulated to appropriate ranges as above-mentioned, the coil-insulating layer having the sufficient size and the appropriate hardness functions to miss an influence of the environment temperature to other direction of the ABS of the magnetic head element by widely expanding and sufficiently absorbing the heat due to rise of the environment temperature. As a result, the heat expansion coefficient of other portions of the magnetic head element is suppressed, also it is evaded that an end of the magnetic head element widely protrudes to magnetic disk surface direction. Therefore, the TPTP phenomenon, that the magnetic head element protrudes, due to the environment temperature is surely suppressed without providing a new particular component in the head.

Furthermore, it is also preferable that heat expansion coefficient of said coil-insulating layer is larger than or equal to $60 \times 10^{-6}$/K. By the setting, the TPTP phenomenon, that the magnetic head element protrudes, due to the environment temperature is surely suppressed.

Furthermore, it is also preferable that said coil layer has two layered structure, corresponding to this, said coil-insulating layer has two layered structure. In this case, at least one layer of the coil-insulating layer should satisfy the above-mentioned ranges.

Furthermore, as one embodiment, it is also preferable that said electromagnetic coil element comprises a lower magnetic pole layer; an upper magnetic pole layer which sandwiches a write gap layer with said lower magnetic pole layer on an end portion on an air bearing surface side; a write coil layer passing through at least between said lower magnetic pole layer and said upper magnetic pole layer for generating write magnetic field; and a write coil-insulating layer which surrounds said write coil layer, said coil layer and said coil-insulating layer being said write coil layer and said write coil-insulating layer, respectively.

Furthermore, as other embodiment, it is also preferable that said electromagnetic coil element comprises a main magnetic pole layer; an auxiliary magnetic pole layer whose end on the air bearing surface side is opposed to the end on the air bearing surface side of the main magnetic pole layer via a gap layer; a write coil layer passing through at least between said main magnetic pole layer and said auxiliary magnetic pole layer for generating write magnetic field; a write coil-insulating layer which surrounds said write coil layer; a backing coil layer formed on an area except the area between said main magnetic pole layer and said auxiliary magnetic pole layer, the backing coil layer having a coil surface parallel to a coil surface of said write coil layer; and a backing coil-insulating layer which surrounds said backing coil layer, said coil layer and said coil-insulating layer being said write coil layer and said write coil-insulating layer, respectively.

Furthermore, as other embodiment, it is also preferable that said electromagnetic coil element comprises a main magnetic pole layer; an auxiliary magnetic pole layer whose end on the air bearing surface side is opposed to the end on the air bearing surface side of the main magnetic pole layer via a gap layer; a write coil layer passing through at least between said main magnetic pole layer and said auxiliary magnetic pole layer for generating write magnetic field; a write coil-insulating layer which surrounds said write coil layer; a backing coil layer formed on an area except the area between said main magnetic pole layer and said auxiliary magnetic pole layer, the backing coil layer having a coil surface parallel to a coil surface of said write coil layer; and a backing coil-insulating layer which surrounds said backing coil layer, said coil layer and said coil-insulating layer being said backing coil layer and said backing coil-insulating layer, respectively.

Furthermore, it is also preferable that said thin-film magnetic head further comprises at least one heating portion for protruding the end on the air bearing surface side of said electromagnetic coil element toward a magnetic recording medium by a heat expansion. In this case, it is also preferable that said thin-film magnetic head further comprises a magnetoresistive effect element for reading data, said heating portion being set between said magnetoresistive effect element and said electromagnetic coil element.

According to the present invention, a HGA is provided, which includes, said thin-film magnetic head and a support mechanism for supporting said thin-film magnetic head.

According to the present invention, a magnetic disk drive apparatus is provided, which includes, at least one above-mentioned head gimbal assembly; at least one magnetic recording medium; a recording/reproducing control circuit for controlling read and write operations of said thin-film magnetic head toward said at least one magnetic recording medium; and a heating control circuit for controlling a heat operation of said heating portion in the case where said thin-film magnetic head comprises said at least one heating portion.

As above-mentioned, in present invention, the size, the heat expansion coefficient, and the Young's modulus of the coil-insulating layer are regulated to appropriate ranges, then the TPTP phenomenon due to the environment temperature which is difficult to determine is surely suppressed. Therefore, even if the thin-film magnetic head comprises the heating portion, it is possible to get a predetermined appropriate protrusion of the end on the magnetic head element by using the control signal value of the heating control circuit.

According to the thin-film magnetic head, the HGA, and the magnetic disk drive apparatus of the present invention, it is possible surely to suppress the TPTP phenomenon due to the environment temperature not using a new particular component. As a result, the problem such as thermal asperity and crush can be dissolved with maintaining low flying height.

BRIEF DESCRIPTION OF THE SEVERAL VIEWS OF THE DRAWINGS

FIG. 9 shows a cross-sectional view showing a figure of the TPTP phenomenon emerged by a simulation;

DETAILED DESCRIPTION OF THE INVENTION

Figure 1:
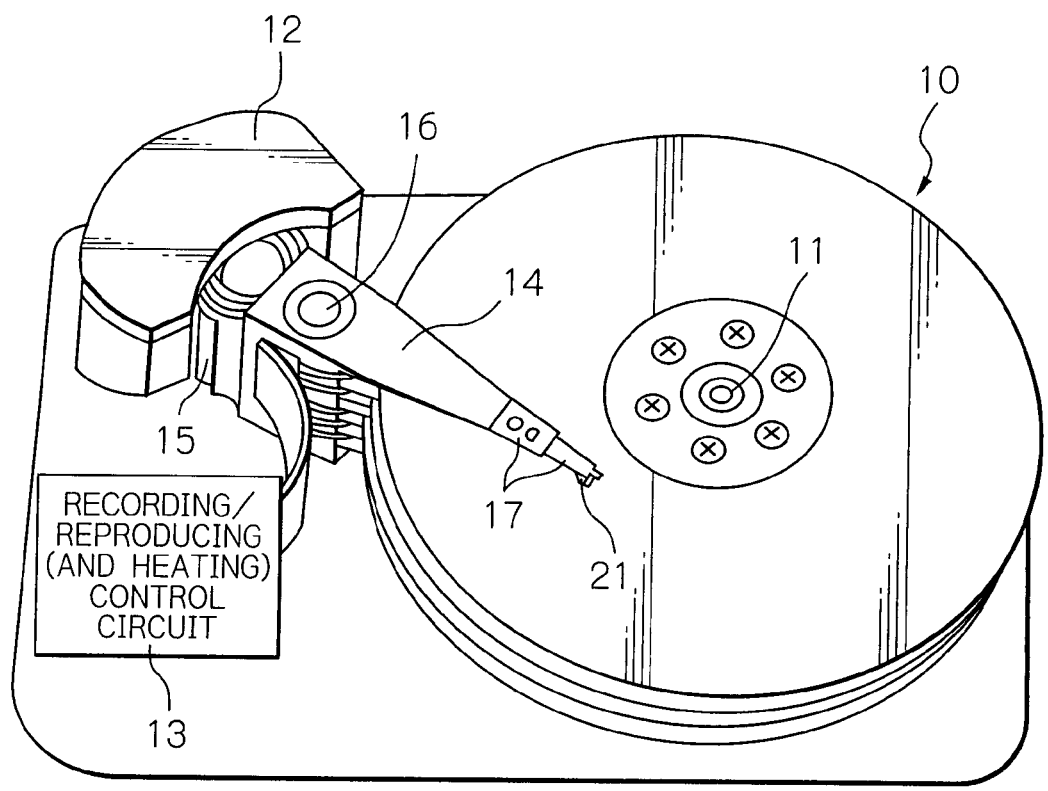
FIG. 1 shows a perspective view schematically illustrating a major portion of an embodiment of the magnetic disk drive apparatus according to the present invention.

FIG. 1 shows a perspective view schematically illustrating a major portion of an embodiment of the magnetic disk drive apparatus according to the present invention.

In FIG. 1, reference numeral 10 indicates a plurality of magnetic disks (magnetic recording media) rotating around a rotational axis of a spindle motor 11, 12 indicates an assembly carriage device for positioning a thin-film magnetic head (slider) 21 on a track, and 13 indicates a recording/reproducing circuit for controlling read/write operations of the thin-film magnetic head, respectively.

The assembly carriage device 12 is provided with a plurality of drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A thin-film magnetic head (slider) 21 is mounted on each HGA 17 in such a way as to be opposed to the surface of the magnetic disk 10. The each number of the magnetic disks 10, the drive arms 14, the HGAs 17 and the thin-film magnetic heads (sliders) 21 can also be only one.

Also, if the thin-film magnetic head 21 has a heating portion for protruding an end of the magnetic head element on the air bearing surface (ABS) side toward the magnetic disk 10 by the heat expansion, the recording/reproducing circuit 13, which will be explained later, may act as a heating control circuit for controlling heating operations of the heating portion with adjusting a heating current provided with the heating portion. The structure of the recording/reproducing and heating control circuit 13 in this case will be explained later.

Figure 2:
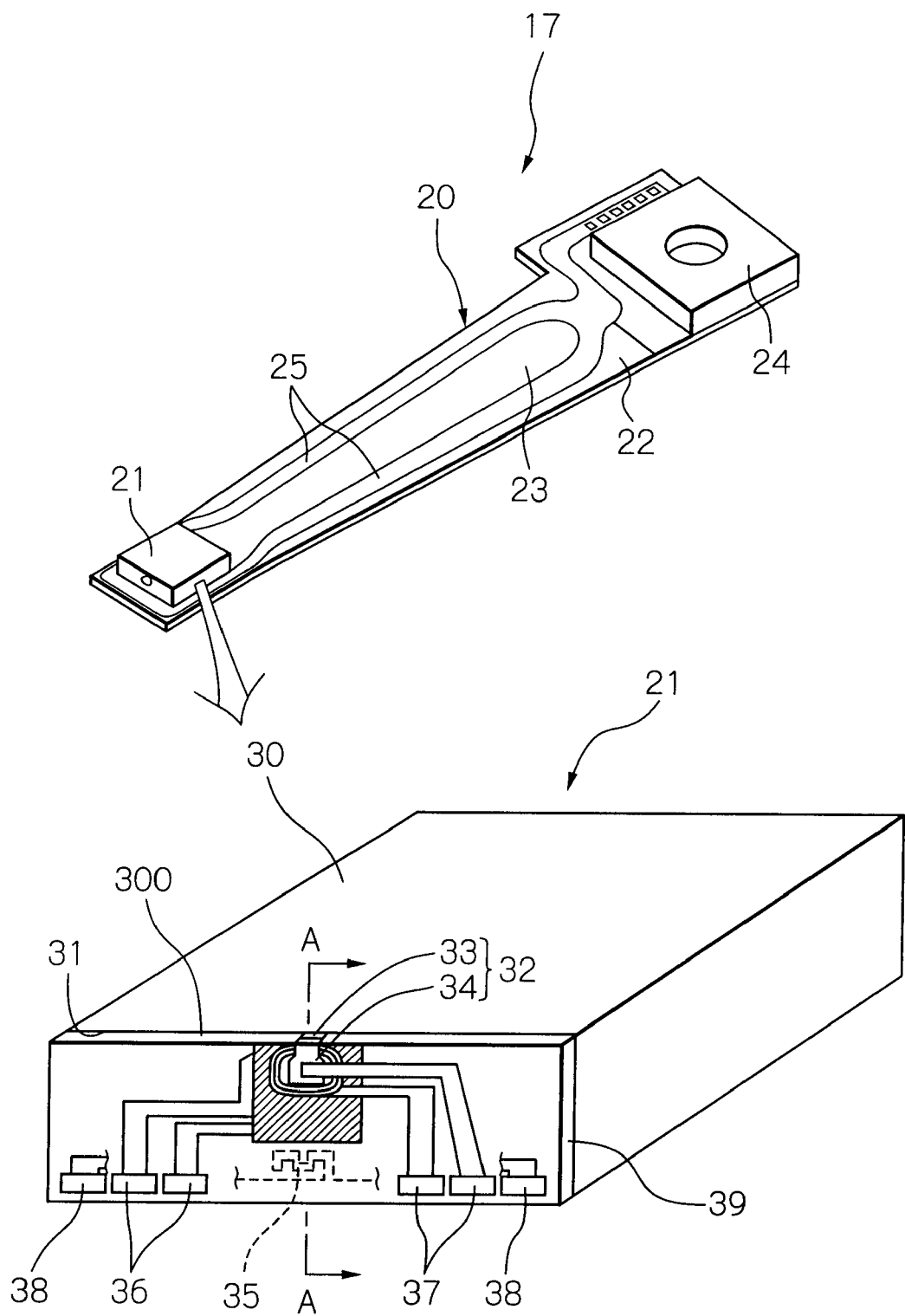
FIG. 2 shows a perspective view illustrating an embodiment of an HGA according to the present invention and a thin-film magnetic head (slider) attached on the end of the HGA.

FIG. 2 shows a perspective view illustrating an embodiment of an HGA according to the present invention and a thin-film magnetic head (slider) attached on the end of the HGA.

As shown in FIG. 2, the HGA 17 includes the slider 21 that has a magnetic head element and is fixed on the end portion of a suspension 20. Signal electrodes of the slider 21 are electrically connected to one end of a wiring member 25.

The suspension 20 includes a load beam 22, a flexure 23 with elasticity fixed on and supported by the load beam 22, a base plate 24 provided on the base of the load beam 22, and a wiring member 25 which is provided on the flexure 23 and consists of lead conductors and connection pads electrically connected to the ends of the lead conductors. While not shown, a head drive IC chip may be attached on a position between the ends of the suspension 20.

Also in FIG. 2, the thin-film magnetic head (slider) 21 includes an ABS 30 processed so as to provide an appropriate flying height, a magnetic head element 32 formed on/above the element formation surface 31, an overcoat layer 39 formed on/above the element formation surface 31 so as to cover the magnetic head element 32, and pairs of signal electrodes 36 and 37 exposed in the surface of the overcoat layer 39. The magnetic head element 32 includes an MR effect element 33 for reading data and an electromagnetic coil element 34 for writing data. The signal electrodes 36 and 37 are connected to the MR effect element 33 and the electromagnetic coil element 34, respectively.

One ends of the MR effect element 33 and the electromagnetic coil element 34 reach the head end surface 300 on the ABS 30 side. The one ends of the elements become opposed to the surface of the magnetic disk, then the head 21 performs a read operation by sensing signal fields from the magnetic disk and a write operation by applying signal fields to the magnetic disk.

Further, as explained later, if the thin-film magnetic head 21 has a heating portion 35, two drive electrodes 38 exposed in the surface of the overcoat layer 39 are connected this heating layer. In this case, two drive electrodes 38 are arranged on both sides of four signal electrodes 36 and 37, respectively. As described in Japanese patent Publication No. 2004-234792A, this arrangement can prevent a cross talk between a wiring of the MR effect element 33 and a wiring of the electromagnetic coil element 34. If the cross talk is permitted, two drive electrodes 38 may be arranged, for example, in any position of four signal electrodes 36 and 37. The number of the electrodes are not limited to the mode in FIG. 2. In FIG. 2, there are six electrodes, however it is also possible to provide five electrodes and a ground connecting to the slider substrate.

The heating portion 35, as shown in FIG. 2, may be provided in the position opposed to the head end surface 300 about the magnetic head element 32. As described below, it also may be provided near the head end surface 300 that is between the MR effect element 33 and the electromagnetic coil element 34. When the heating portion 35 is provided, the magnetic head element 32 protrudes magnetic disk surface direction in form to let the head end surface 300 project by its heat expansion with the heat occurred the current flow to the heating portion 35 or by the heat expansion of the material surrounding it. By controlling the protrusion movement with adjusting the current flow to the heating portion 35, it is possible to control the magnetic effective distance $d_M$ between the end of the magnetic head element 32 and the magnetic disk surface to the desirable minute value.

Figure 3A:
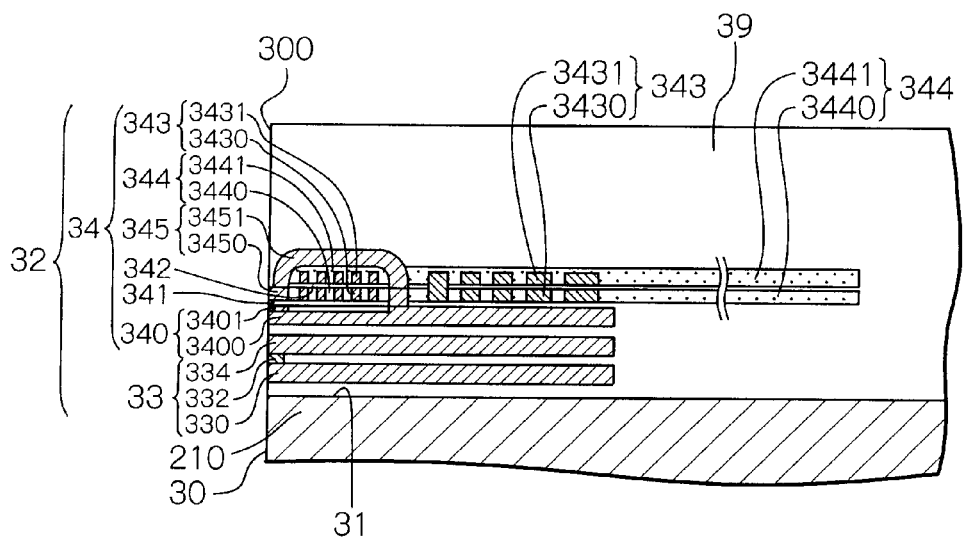
FIG. 3a shows a cross-sectional view taken along line A-A in FIG. 2, illustrating a configuration of a main part of the thin-film magnetic head according to the present invention.
Figure 3B:
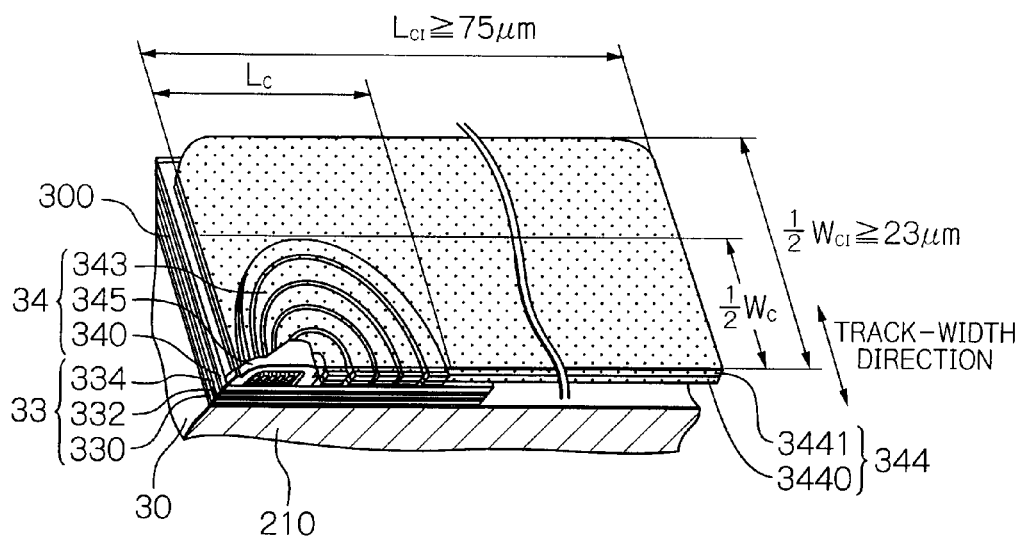
FIG. 3b shows a perspective view including a cross-section surface taken along line A-A shown in FIG. 2.

FIG. 3a shows a cross-sectional view taken along line A-A in FIG. 2, illustrating a configuration of a main part of the thin-film magnetic head according to the present invention. FIG. 3b shows a perspective view including a cross-section surface taken along line A-A shown in FIG. 2. Although the head shown in FIG. 3a and FIG. 3b can have the heating portion 35, this structure is omitted in these FIGS.

In FIG. 3a, reference numeral 210 indicates a slider substrate made of, for example, AlTiC ($Al_2O_3$—TiC) and so on, which has an ABS 30 opposing the surface of the magnetic disk. An MR effect element 33 for reading, an electromagnetic coil element 34 for writing, and an overcoat layer 39 that protects these elements are formed on/above an element formation surface 31, which is a side surface when the ABS 30 of the slide substrate 210 is at the bottom.

The MR effect element 33 includes an MR effect multilayer 332, and a lower shield layer 330 and an upper shield layer 334 sandwiching the MR effect multilayer 332. The lower shield layer 330 and the upper shield layer 334 are a metal layer and formed of, for example, NiFe, CoFeNi, CoFe, FeN or FeZrN, etc. with a thickness of approximately 0.5 μm to 3 μm by using a pattern plating method such as frame plating.

The MR effect multilayer 332 includes a current-in-plane (CIP) giant magnetoresistive (GMR) effect multilayered film, a current-perpendicular-to-plane (CPP) GMR effect multilayered film, or a tunnel magnetoresistive (TMR) effect multilayered film, and senses a signal field from the magnetic disk with an extremely high sensitivity. The upper and lower shield layers 334 and 330 prevent the MR effect multilayer 332 from receiving an external magnetic field that causes noise.

If the MR effect multilayer 332 includes a CIP-GMR effect multilayered film, upper and lower shield gap layers for insulation are provided between the MR effect multilayer 332 and respective upper and lower shield layers 334 and 330. Further, an MR lead conductor layer is formed for supplying a sense current to the MR effect multilayer 332 and bringing out a reproduction output. On the other hand, when the MR effect multilayer 332 includes a CPP-GMR effect multilayered film or a TMR effect multilayered film, the upper and lower shield layers 334 and 330 also function as upper and lower electrodes, respectively. In this case, the upper and lower shield gap layers and the MR lead conductor layer are not needed and are omitted. Though not shown in the figure, an insulating layer is formed between the upper and lower shield layers opposed to the head end surface 300 of the MR effect multilayer 332, and further, insulating layers, or bias insulating layers and hard bias layers which consist of a ferromagnetic material, for applying a bias magnetic field for stabilization of a magnetic-domain, may be formed on both sides along the track-width direction of the MR effect multilayer 332.

If the MR effect multilayer 332 includes for example the tunnel magnetoresistive (TMR) effect multilayered film, it has a stacked structure of an antiferromagnetic layer formed of IrMn, PtMn, NiMn, RuRhMn, etc., with a thickness of approximately 5-15 nm; a pinned layer whose magnetization direction is fixed by the antiferromagnetic layer and which consists of CoFe, etc., which is a ferromagnetic material, or two layers CoFe, etc., sandwiching the non-magnetic metal material such as Ru or CoFe; a tunnel barrier layer which consists of non-magnetic dielectric material that a metal layer formed of Al, AlCu, etc., with a thickness of approximately 0.5-1 nm is oxidized by natural oxidation or oxygen in a vacuum apparatus; and a free layer which is coupled with the pinned layer by tunnel exchange coupling through the tunnel barrier layer and which consists of, for example, a two layers of CoFe, etc., which is the ferromagnetic material, with a thickness of approximately 1 nm and NiFe, etc., which is the ferromagnetic material, with a thickness of approximately 3-4 nm, in this order.

The magnetic coil element 34 includes a lower magnetic layer 340, a write gap layer 341, a write coil layer 343, a write coil-insulating layer 344, and an upper magnetic pole layer 345. The write coil layer 343 is two layers structure formed of a lower write coil layer 3430 and an upper write coil layer 3431, and is formed in such a manner that it passes at least between the lower magnetic pole layer 340 and the upper magnetic pole layer 345. The lower magnetic pole layer 340 and the upper magnetic pole layer 345 function as a magnetic flux guide for a magnetic flux excited by the write coil layer 343.

The lower magnetic pole layer 340 includes a lower yoke layer 3400, and a lower magnetic pole portion 3401 which is formed on the end portion on the ABS 30 side (head end surface 300) of the lower yoke layer 3400 and extending to the head end surface 300, and whose upper surface is in contact with the surface of the write gap layer 341. The lower yoke layer 3400 is a metal layer and formed of, for example, NiFe, CoFeNi, CoFe, FeN or FeZrN, etc. with a thickness of approximately 0.5 μm to 3.5 μm by using a pattern plating method such as frame plating or sputtering. Also, the lower magnetic pole portion 3401 is a metal layer and formed of, for example, NiFe, CoFeNi, CoFe, FeN or FeZrN, etc. with a thickness of approximately 0.25 μm to 0.6 μm by using such as sputtering. The saturation magnetic flux density of the lower magnetic pole portion 3401 is set higher than that of the lower yoke layer 3400, and is at least 2.0 teslas (T).

The upper magnetic pole layer 345 includes an upper magnetic pole portion 3450 whose lower surface is in contact with the surface of the write gap layer 341, and an upper yoke layer 3451 whose end portion on the ABS side is in contact with the surface of the upper magnetic pole portion 3450. The upper magnetic pole portion 3450 is a metal portion and formed of, for example, NiFe, CoFeNi, CoFe, FeN or FeZrN, etc. with a thickness of approximately 1 µm to 3 µm by using a pattern plating method such as frame plating or sputtering. Also, the upper yoke layer 3451 is a metal layer and formed of, for example, NiFe, CoFeNi, CoFe, FeN or FeZrN, etc. with a thickness of approximately 0.5 µm to 3.0 µm by using a pattern plating method such as frame plating. The saturation magnetic flux density of the upper magnetic pole portion 3450 is set higher than that of the upper yoke layer 3451, and is at least 2.0 T.

The lower magnetic pole portion 3401 and the upper magnetic pole portion 3450 sandwich the end portion on the ABS side (head end surface 300 side) of the write gap layer 341. A leakage magnetic field from this end portion of the write gap layer 341 performs a write operation onto the magnetic disk. The ends on the magnetic disk side of the lower magnetic pole portion 3401 and upper magnetic pole portion 3450 extend to the head end surface 300, which are coated with ultrathin protective film made of a material such as diamond-like carbon (DLC). While the write coil layer 343 is shown as a single layer in FIG. 3a, it may consist of two or more layers or a helical coil.

Further, a non-magnetic layer made of an insulating material or a metal is provided between the upper shield layer 334 and the lower magnetic pole layer 340 for isolating the MR effect element 33 from the electromagnetic coil element 34. However, as explained later, the non-magnetic layer is not necessarily needed and may be omitted and the upper shield layer may also be used as the lower magnetic pole layer.

The write coil-insulating layer 344 is two layers structure formed of an lower write coil-insulating layer 3440 surrounding the lower write coil layer 3430 and an upper write coil-insulating layer 3441 surrounding the upper write coil layer 3431. This write coil-insulating layer 344 is provided for electrically isolating between the write coil layer 343, and the upper and lower magnetic pole layer 345 and 340. An upper and lower coil-insulating layer 342 is provided between the lower write coil layer 3430 and the lower write coil-insulating layer 3440, and the upper write coil layer 3431 and the upper write coil-insulating layer 3441 for electrically isolating between both.

The lower write coil layer 3430 and the upper write coil layer 3431 are a metal layer and formed of, for example, Cu, etc. with a thickness of approximately 0.3 µm to 5 µm by using such as frame plating. Also, the lower write coil-insulating layer 3440 and the upper write coil-insulating layer 3441 are a plastic layer and formed of, for example, a heat-cured photo resist, etc. with a thickness of approximately 0.5 µm to 7 µm by using such as photolithography. Further, the write gap layer 341 is an insulating layer and formed of, for example, $Al_2O_3$, $SiO_2$, A1N, or DLC, etc. with a thickness of approximately 0.01 µm to 0.1 µm by using such as sputtering or CVD.

Thus, the write coil-insulating layer 344 is formed of the plastic material; the upper and lower shield layer 334 and 330, and the upper and lower magnetic pole layer 345 and 340, etc. are formed of the metal material. On the other hand, the overcoat layer 39 is formed of an insulation material, for example, $Al_2O_3$, or $SiO_2$, etc. by using such as sputtering. Usually, the heat expansion coefficient of the metal material and that of the plastic material are about 2 to 3 times and about 10 times larger than that of the insulation material, respectively. As a result, the difference of the heat expansion coefficient between the magnetic head element and the overcoat layer causes the environment temperature, then this occurs the TPTP phenomenon which an end on the head end surface 300 of the magnetic head element 32 protrudes to magnetic disk surface direction.

In the thin-film magnetic head according to the present invention, surely in order to suppress the TPTP phenomenon due to the environment temperature, the heat expansion coefficient and Young' modulus are regulated as below in the coil-insulating layer 344 which has a predetermined size.

As shown in FIG. 3b, with respect to the size of the write coil-insulating layer 344, a width $W_{CI}$ of the track-width direction is larger than a width $W_C$ that is a minimum size to need to insulate the whole write coil layer 343, and is at least equal to or larger than 46 µm, a length $L_{CI}$ (a length of the depth direction viewed from the ABS 30 side) of a direction perpendicular to the track-width direction is larger than a length $L_C$ that is a minimum length to need to insulate the whole coil layer 343, and is at least equal to or larger than 75 µm.

In this coil-insulating layer 344, the heat expansion coefficient $I_{IN}$ is regulated to at least $30 \times 10^{-6}$/K or more, the Young's modulus $Y_{IN}$ is regulated to 1 Gpa to 4 Gpa. Although the minimum width $W_C$ and the minimum length $L_C$ are approximately 0.1-1 µm larger than the width of the track-width direction and the length of the direction perpendicular to the track-width direction of the write coil layer 343, respectively, these may consider as the width and the length of the write coil layer 343, virtually.

In contrast this coil-insulating layer 344 according to the present invention, in the conventional coil-insulating layer consisted of a photo-resist layer, the heat expansion coefficient $I_{IN}$ is approximately $30 \times 10^{-6}$/K, and the Young's modulus $Y_{IN}$ is approximately 6 Gpa. These are confirmed with an experiment and a simulation by the inventor. Therefore, the coil-insulating layer 344 according to the present invention has the heat expansion coefficient $I_{IN}$ which is larger than that of the conventional one, further, has the range of Young's modulus $Y_{IN}$ with the predetermined low limit which is smaller than that of the conventional one. It should be noticed that values of these heat expansion coefficient $I_{IN}$ and the Young's modulus $Y_{IN}$ are not the bulk values of photo-resist raw material but the values of the minute volume of virtually minute processed form.

Here, if the coil-insulating layer 344 consists of the photo-resist, as a method for setting the heat expansion coefficient and the Young's modulus to a predetermined value, it may use the method such as a selection, and an adjustment, etc. of a cure temperature, a resist kind (a novolac-type, etc.), a resist viscosity, and an exposure condition which affect the heat expansion coefficient and the Young's modulus.

If the size, the heat expansion coefficient $I_{IN}$, and the Young's modulus $Y_{IN}$ of the coil-insulating layer 344 are regulated to appropriate ranges as above-mentioned, as shown in embodiments later, the coil-insulating layer 344 having the sufficient size and the appropriate hardness functions to miss an influence of the environment temperature to other direction of the ABS of the magnetic head element 32 by widely expanding and sufficiently absorbing the heat due to rise of the environment temperature. As a result, the heat expansion coefficient of other portions of the magnetic head element 32 is suppressed, also it is evaded that an end of the magnetic head element widely protrudes to magnetic disk surface direction. Therefore, the TPTP phenomenon, that the magnetic head element protrudes, due to the environment temperature is surely suppressed without providing a new particular component in the head.

Figure 4A:
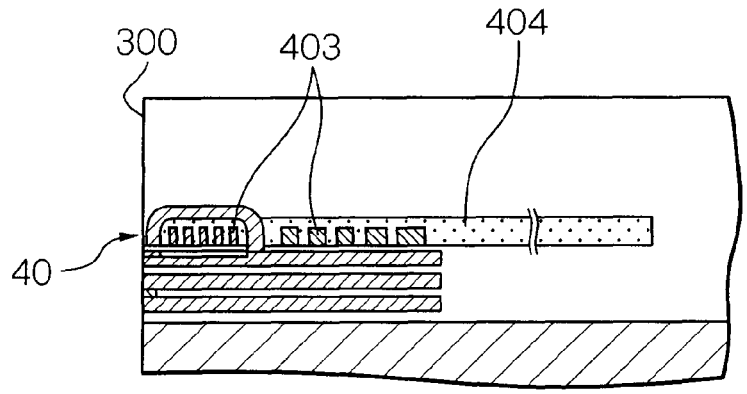
FIGS. 4a to 4e show perspective views illustrating a configuration of a portion of alternatives of the thin-film magnetic head according to the present invention.
Figure 4B:
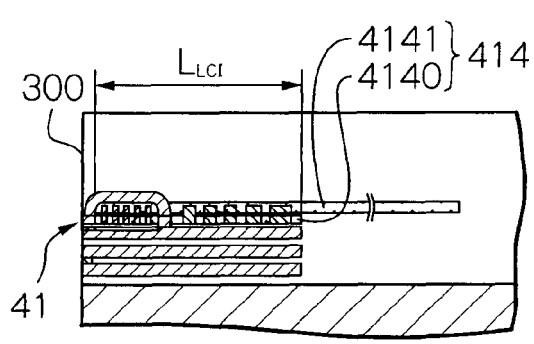
Figure 4C:
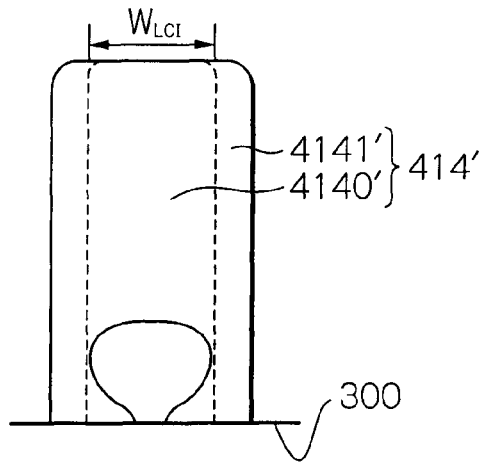
Figure 4D:
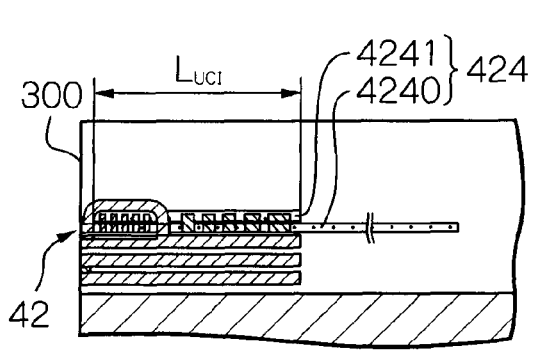
Figure 4E:
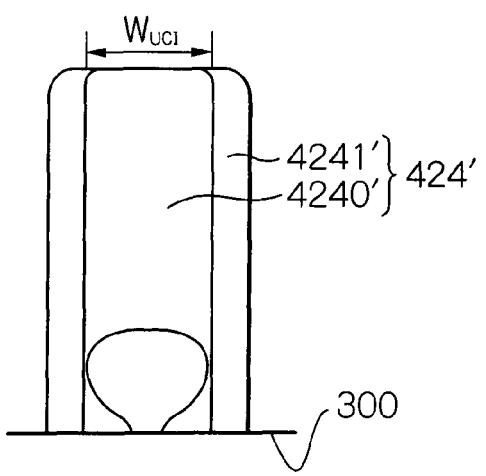

FIGS. 4a to 4e show perspective views illustrating a configuration of a portion of alternatives of the thin-film magnetic head according to the present invention. Here, FIGS. 4a, 4b and 4d show cross sectional views taken along line A-A of FIG. 2, and FIGS. 4c and 4e show plain views through from the side of the element-formed surface.

According to FIG. 4a, an electromagnetic coil element 40 has a write coil layer 403 that is a single layer. Corresponding to this, a write coil-insulating layer 404 is also a single layer. In this case, by the heat expansion coefficient $I_{IN}$ and the Young's modulus $Y_{IN}$ of the write coil-insulating layer 404 being regulated to above-mentioned ranges, the heat expansion coefficient of other portions of the magnetic head element is suppressed, also it is evaded that an end of the magnetic head element widely protrudes to magnetic disk surface direction. Therefore, the TPTP phenomenon due to the environment temperature is surely suppressed.

According to FIG. 4b, in the case where an electromagnetic coil element 41 has a write coil layer that is two layers, corresponding to this, a write coil-insulating layer 414 is also two layers which consists of upper and lower write coil-insulating layers 4141 and 4140. Here, in this two layers, only the upper write coil-insulating layer 4141 has the heat expansion coefficient $I_{IN}$ and the Young's modulus $Y_{IN}$ regulated to the above-mentioned ranges, and the lower write coil-insulating layer 4140 may at least have the length $L_{LCI}$ which is smaller than the above-mentioned minimum value. Or, as shown in FIG. 4c, the width $W_{LCI}$ of the lower write coil-insulating layer 4140' may be smaller than the above-mentioned minimum value. In these cases, as the upper write coil-insulating layer 4141 or 4141' satisfies the above-mentioned condition, the TPTP phenomenon due to the environment temperature is surely suppressed.

Further, as shown in FIG. 4d, only the lower write coil-insulating layer 4204 has the size, the heat expansion coefficient $I_{IN}$ and the Young's modulus $Y_{IN}$ regulated to the above-mentioned ranges, and the upper write coil-insulating layer 4241 may at least have the length $L_{UCI}$ which is smaller than the above-mentioned minimum value. Or, as shown in FIG. 4e, the width $W_{LCI}$ of the upper write coil-insulating layer 4241' may be smaller than above-mentioned minimum value. In these cases, as the lower write coil-insulating layer 4240 or 4240' satisfies the above-mentioned condition, the TPTP phenomenon due to the environment temperature is surely suppressed.

That is to say, at least one layer of the upper and lower write coil-insulating layer should satisfy the above-mentioned condition. Further, in the case where the write coil layer is a three or more layered structure, corresponding to this, a write coil-insulating layer is also a three or more layered structure, if only one of the layers satisfies the above-mentioned condition, the TPTP phenomenon due to the environment temperature is surely suppressed.

Figure 5A:
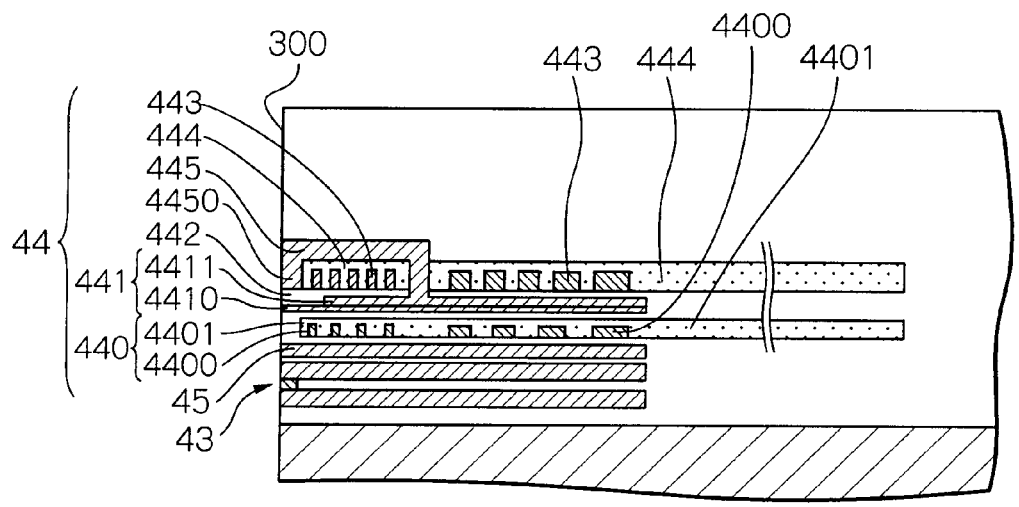
FIGS. 5a and 5b show perspective views illustrating a configuration of a portion of alternatives of the thin-film magnetic head according to the present invention.
Figure 5B:
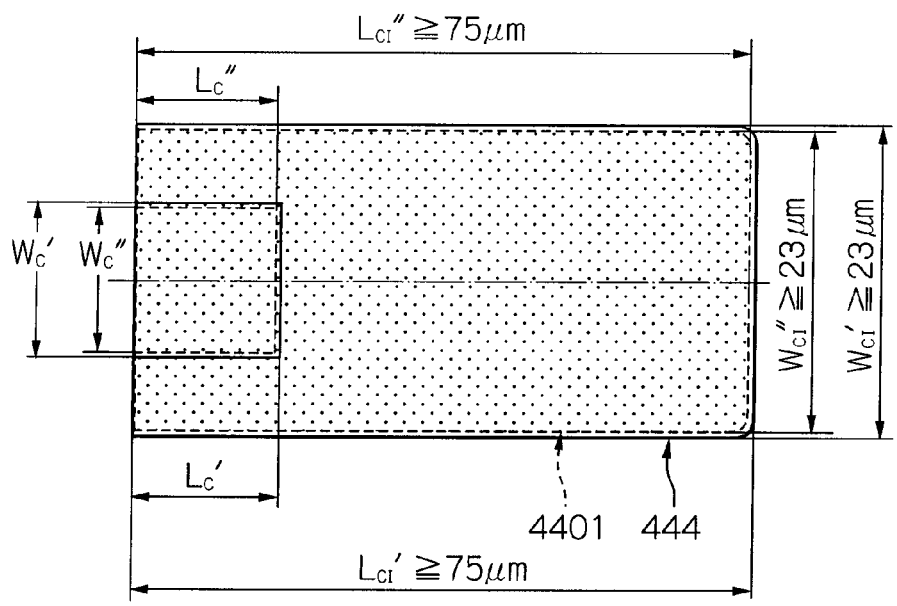

FIG. 5 shows a perspective view illustrating a configuration of a portion of alternatives of the thin-film magnetic head according to the present invention. Here, FIG. 5a shows a cross sectional view taken along line A-A of FIG. 2, and FIG. 5b shows a plain view through from the side of the element-formed surface.

According to FIG. 5a, the electromagnetic coil element 44 for writing data is for perpendicular magnetic recording, and includes a backing coil portion 440, a main magnetic pole layer 441, a gap layer 442, a write coil layer 443, a coil-insulating layer 444, and an auxiliary magnetic pole layer 445. Reference numeral 45 indicates a shielding-between-elements layer for magnetically shielding the MR effect element 43 for writing data from the electromagnetic coil element 44.

The main magnetic pole layer 441 is a magnetic path to guide and converge the magnetic flux excited by currents flowing through the coil layer 443 to a perpendicular magnetic recording layer of the magnetic disk, and consists of a main magnetic pole main layer 4411 and a main magnetic pole auxiliary layer 4410. The length (thickness) in the stacking direction of the end portion in the head end surface 300 side of the main magnetic pole layer 441 corresponds a thickness of only the main magnetic pole main layer 4411, and becomes smaller than that of the other portions. As a result, the main magnetic pole layer 441 can generate a fine write field corresponding to higher density recording.

An end portion in the head end surface 300 side of the auxiliary magnetic pole layer 445 becomes a trailing shield portion 4450 whose cross-section layer is wider than that of the other portion of the auxiliary magnetic pole layer 445. The trailing shield portion 4450 is opposed to the end in the ABS side of the main magnetic pole layer 441 via a gap layer 442. Providing such trailing shield portion 4450, the magnetic slope between the end of the trailing shield portion 4450 near the head end surface 300 and the end of the main magnetic pole layer 441 is steeper. As a result, a read error rate can become smaller as a jitter of the signal output becomes smaller.

The write coil layer 443 is formed in such a manner that it passes at least between the main magnetic pole layer 441 and the auxiliary magnetic pole layer 445 between one turn. The write coil-insulating layer 444 surrounds the write coil layer 443, is provided for electrically insulating between the write coil layer 443, and the main magnetic pole layer 441 and the auxiliary magnetic pole layer 445.

As shown in FIG. 5b, with respect to the size of the write coil-insulating layer 444, a width $W_{CI}'$ of the track-width direction is larger than a width $W_C'$ that is a minimum size to need to insulate the whole write coil layer 443, and is at least equal to or larger than 46 µm, a length $L_{CI}'$ of a direction perpendicular to the track-width direction is larger than a length $L_C'$ that is a minimum length to need to insulate the whole write coil layer 443, and is at least equal to or larger than 75 µm.

In this write coil-insulating layer 444, the heat expansion coefficient $I_{IN}$ is regulated to at least $30 \times 10^{-6}$/K or more, the Young's modulus $Y_{IN}$ is regulated to 1 Gpa to 4 Gpa. Although the minimum width $W_C'$ and the minimum length $L_C'$ are approximately 0.1-1 µm larger than the width of the track-width direction and the length of the direction perpendicular to the track-width direction of the write coil layer 443, respectively, these may consider as the width and the length of the write coil layer 443, virtually.

If the size, the heat expansion coefficient $I_{IN}$, and the Young's modulus $Y_{IN}$ of the write coil-insulating layer 444 are regulated to appropriate ranges as above-mentioned, as shown in embodiments later, the write coil-insulating layer 444 having the sufficient size and the appropriate hardness functions to miss an influence of the environment temperature to other direction of the ABS in the magnetic head element mainly. As a result, the heat expansion coefficient of other portions in the magnetic head element is suppressed, also it is evaded that an end of the magnetic head element widely protrudes to magnetic disk surface direction. Therefore, the TPTP phenomenon, that the magnetic head element protrudes, due to the environment temperature is surely suppressed without providing a new particular component in the head.

Also, according to FIG. 5a, the electromagnetic coil element 44 is provided with the backing coil portion 440 between the shielding-between-elements layer 45 and the main magnetic pole layer 441. The backing coil portion 440 consists of a backing coil layer 4400 and a backing coil-insulating layer 4401, and the backing coil portion 440 suppresses the wide area adjacent-track erase (WATE) behavior which is an unwanted write or erasing operation to the magnetic disk, by generating a magnetic flux for negating the magnetic loop that arises from the main magnetic pole layer 441 and the auxiliary magnetic pole layer 445 through the upper and lower shield layers of the MR effect element 43.

Here, it is also preferable that the backing coil-insulating layer 4401 of the backing coil portion 440 has the size, the heat expansion coefficient $I_{IN}$, and the Young's modulus $Y_{IN}$ as above-mentioned. As shown in FIG. 5b, a width $W_{CI}''$ of the track-width direction is larger than a width $W_C''$ that is a minimum size to need to insulate the whole backing coil layer 4400, and is at least equal to or larger than 46 µm, a length $L_{CI}''$ of a direction perpendicular to the track-width direction is larger than a length $L_C''$ that is a minimum length to need to insulate the whole backing coil layer 4400, and is at least equal to or larger than 75 µm. In this backing coil-insulating layer 4401, it is also preferable that the heat expansion coefficient $I_{IN}$ is regulated to at least $30 \times 10^{-6}$/K or more, the Young's modulus $Y_{IN}$ is regulated to 1 Gpa to 4 Gpa. In this case, the TPTP phenomenon due to the environment temperature is surely suppressed.

Here, at least one layer of the write coil-insulating layer 444 and the backing coil-insulating layer 4401 should satisfy the above-mentioned condition. Further, in the case where the write coil layer is a two or more layered structure, corresponding to this, a write coil-insulating layer is also a two or more layered structure, if only one of the layers satisfies the above-mentioned condition, the TPTP phenomenon due to the environment temperature is surely suppressed.

Figure 6A:
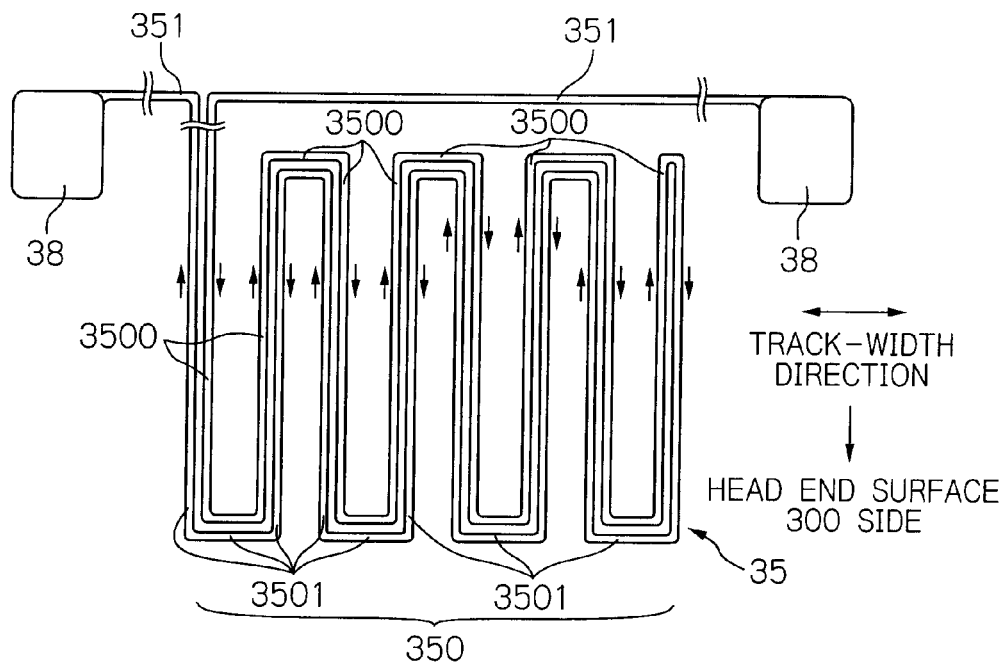
FIG. 6a shows a plain view through from the side of the element-formed surface illustrating a structure of a heating portion 35 with which the thin-film magnetic in FIG. 2 is provided as an embodiment.
Figure 6B:
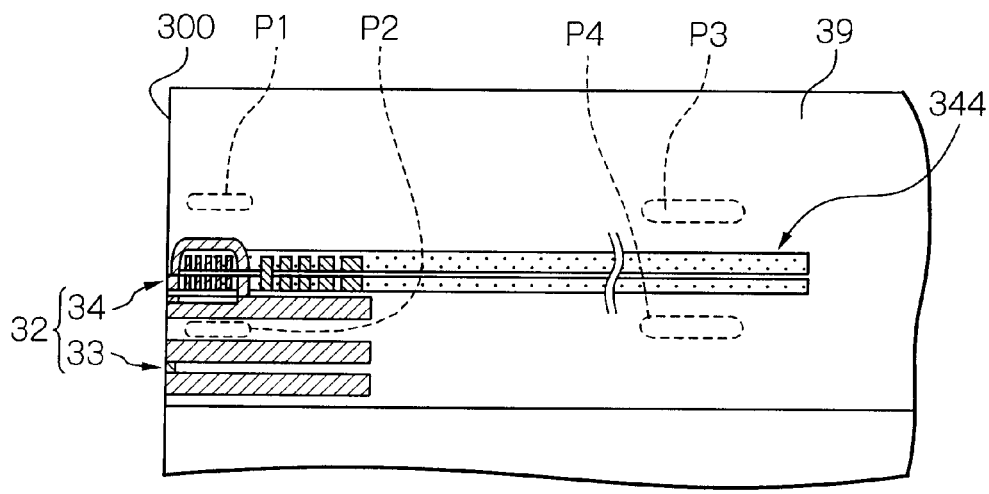
FIG. 6b shows a cross sectional view taken along line A-A of FIG. 2 illustrating a position in the head when the heating portion 35 is provided.

FIG. 6a shows a plain view through from the side of the element-formed surface illustrating a structure of a heating portion 35 with which the thin-film magnetic in FIG. 2 is provided as an embodiment, and FIG. 6b shows a cross sectional view taken along line A-A of FIG. 2 illustrating a position in the head when the heating portion 35 is provided.

According to FIG. 6a, the heating portion 35 has a heating line layer 350 meandered one line in the layer and a lead line layer 351 which connects the both ends of the heating line layer 350, and is a current flow path with a predetermined length. The heating line layer 350 has an upper portion 3500 and a lower portion 3501 formed in such a way as to meander through in the shape of rectangle wave. One end of the lead line layer 351 is connected the drive electrodes 38, the heating portion 35 takes power supply for the heating from a heating control circuit via this drive electrodes 38. The shape of the heating line layer 350 is not limited to this shape of rectangle wave, it is also possible to be one line shape, U-shape, or spiral shape.

It is preferable that the heating line layer 350 is, for example, a thickness of approximately 0.1 µm to 5 µm, and formed of, for example, NiCu, NiCr, Ta, W, Ti, Cu, Au or NiFe, etc. Also, the lead line layer 351 may be formed of the same material as the heating line layer 350.

The heating portion 35 having such structure may be arranged in any part of a position P1 to P4 in the thin-film magnetic head as shown in FIG. 6b. That is to say, it may be arranged in a position P1 near the head end surface 300 above the electromagnetic coil element 34 in the overcoat layer 39, it may be arranged in a position P2 near the head end surface 300 between the MR effect element 32 and the electromagnetic coil element 34, it may be arranged in a position P3 above or a position P4 below the coil-insulating layer opposed to the head end surface 300 of the magnetic head element 32. Especially, in the case where the heating portion 35 is arranged in the position P2, it has a much better good protrusion efficiency of the end of the magnetic head element, a better protrusion response at a point of electric power consumption than other positions.

Figure 7:
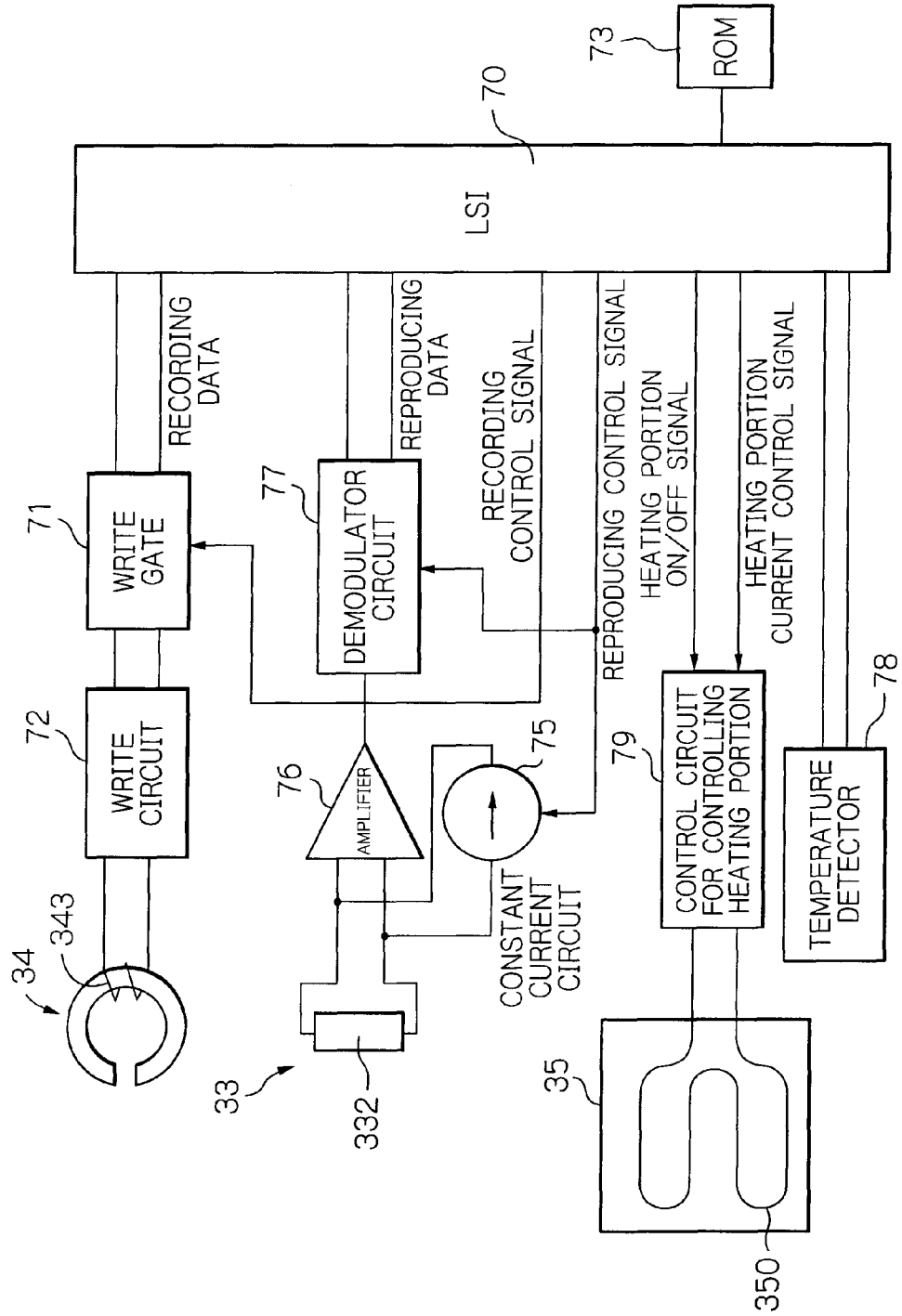
FIG. 7 shows a block diagram illustrating the circuit structure of the recording/reproducing and heating control circuit 13 of the magnetic disk drive apparatus shown in FIG. 1.

FIG. 7 shows a block diagram illustrating the circuit structure of the recording/reproducing and heating control circuit 13 of the magnetic disk drive apparatus shown in FIG. 1.

In FIG. 7, reference numeral 70 indicates a control LSI, 71 indicates a write gate for receiving recording data from the control LSI 70, 72 indicates a write circuit, 73 indicates a ROM that stores a control table and so on for controlling currents applied to the heating potation 35, 75 indicates a constant current circuit for supplying sense currents to the MR effect element 33, 76 indicates an amplifier for amplifying the output voltage from the MR effect element 33, 77 indicates a demodulator circuit for outputting reproduced data to the control LSI 70, 98 indicates a temperature detector, and 99 indicates a control circuit for controlling the heating potation 35, respectively.

The recording data that is output from the control LSI 70 is supplied to the write gate 71. The write gate 71 supplies recording data to the write circuit 72 only when a recording control signal that is output from the control LSI 70 instructs a write operation. The write circuit 72 passes write currents corresponding to this recording data through the coil layer 343, and the electromagnetic coil element 34 writes data on the magnetic disk.

Constant currents flow from the constant current circuit 75 into the MR multilayer 332 only when the reproducing control signal that is output from the control LSI 70 instructs a read operation. The signal reproduced by this MR effect element 33 is amplified by the amplifier 76, demodulated by the demodulator circuit 77, and then, the obtained reproduced data is output to the control LSI 70.

The heating potation control circuit 79 receives a heating potation ON/OFF signal and a heating potation current control signal that are output from the control LSI 70. When the heating potation ON/OFF signal is an ON operation instruction, a current is applied to the heating line layer 350 of the heating potation 35. The current value in this case is controlled to a value corresponding to the heating potation current control signal. The control LSI 70 determines the values of the heating potation ON/OFF signals and the heating potation current control signals by referring the situation of the recording/reproducing operation and the measured temperature values with the temperature detector 78. Thus, it is possible to realize not only a current application to the heating portion 35 linked with the write and read operations but also a more diversified current application mode by providing the system of the heating portion ON/OFF signal and the heating portion current value control signal independently from the recording/reproducing control signal system.

However, actually, it is very difficult to determine an appropriate environment temperature by only the measured temperature values with the temperature detector 78, and then the case that above-mentioned control does not go well occurs when the TPTP phenomenon due to an environment temperature is large. Whereas, in the present invention, by appropriately regulating the size, the heat expansion coefficient and the Young's modulus of the coil-insulating layer, the TPTP phenomenon due to the environment temperature which is difficult to determine is surely suppressed. Therefore, using the value of the heating portion current value control signal which the control LSI determines, it is possible to get a desirable appropriate protrusion of the end of the magnetic head element.

It is obvious that the circuit structure of the recording/reproducing and heating control circuit 13 is not limited to that shown in FIG. 7. It is also possible to specify the write and read operations using a signal other than the recording/reproducing control signal. Although it is preferable that the heating of the heating portion 35 is performed when both writing and reading, it is possible that the heating of the heating portion 35 may be performed only when either writing or reading, or only in a predetermined period. Furthermore, it is also possible to use not only DC but also AC or pulse current, etc., as the currents flowing through the heating portion 35.

Hereinafter, an effect to suppress the TPTP phenomenon due to an environment temperature will be explained by comparative examples and practical examples of the present invention with simulation.

Figure 8A:
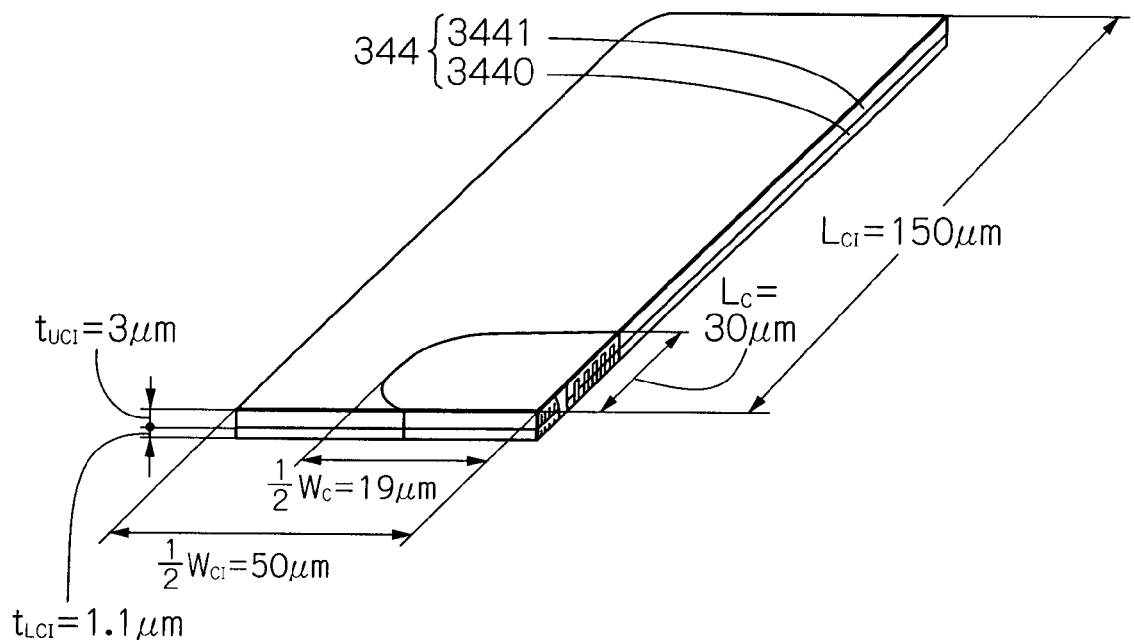
FIG. 8a shows a perspective view schematically illustrating a major portion of the coil-insulating layer 344 in the thin-film magnetic head model using below simulation.
Figure 8B:
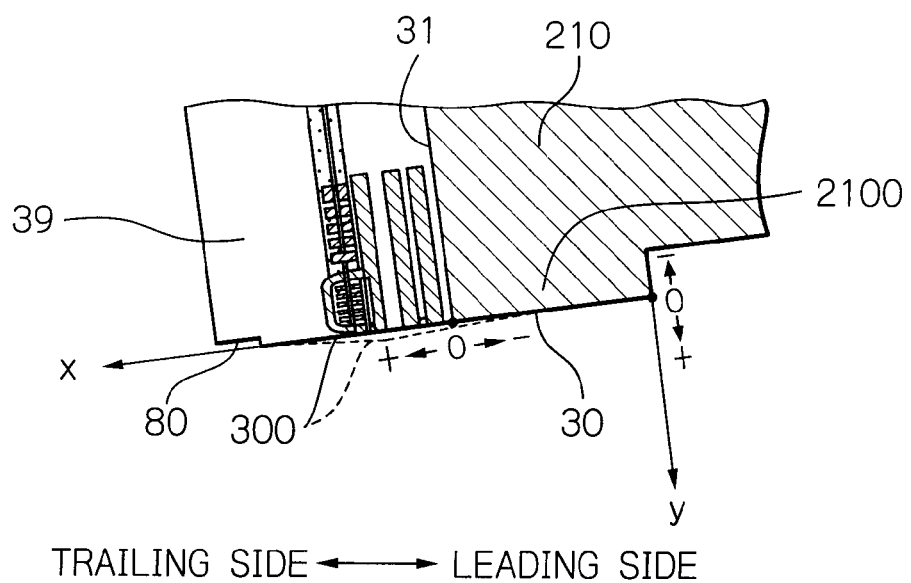
FIG. 8b shows a schematic view insulating a coordinate in a graph showing protrusion of the end of the magnetic head element by the TPTP phenomenon due to the environment temperature.

FIG. 8a shows a perspective view schematically illustrating a major portion of the coil-insulating layer 344 in the thin-film magnetic head model using below simulation, FIG. 8b shows a schematic view insulating a coordinate in a graph showing protrusion of the end of the magnetic head element by the TPTP phenomenon due to the environment temperature.

According to FIG. 8a, the write coil-insulating layer 344 in the below practical example is formed of the upper/lower write coil-insulating layer 3441 and 3440, corresponding to that the write coil layer 343 is the two layered structure. Here, half of widths ½×$W_{CI}$ of the track-width direction of the lower/upper write coil-insulating layer 3441 and 3440 are larger than half of widths ½×$W_C$=19 μm that are a minimum size to need to insulate the whole write coil layer 343, and is equal to 50 μm ($W_{CI}$=100 μm) and larger than ½×46 μm=23 μm, and a length $L_{CI}$ of direction perpendicular to the track-width direction is larger than a length $L_C$=30 μm that is a minimum length to need to insulate the whole write coil layer 343, and is at least equal to 150 μm and larger than 75 μm.

Besides, thicknesses $t_{UCI}$ and $t_{LCI}$ of the upper/lower write coil-insulating layer 3441 and 3440 are 3 μm and 1.1 μm, respectively, and these values are same in the below practical examples and comparative examples.

According to FIG. 8b, in a graph showing the protrusion of the end of the magnetic head element by the TPTP phenomenon, a horizontal axis is a x-axis in this figure, and is a position on the head end surface 300 (ABS30) toward the stacking direction. In this case, a plus direction is a direction toward a trailing edge and a zero base point is a position of the element formation surface 31 of the slider substrate 210. Also, a vertical axis is a y-axis in this figure, and is a amount of protrusion in direction perpendicular to the head end surface 300 (ABS30) on the target position on the head end surface 300 (ABS30). In this case, a plus direction is a direction toward the magnetic disk and a zero base point is a position of the leading side edge of a pad 2100. Below, the graph showing the protrusion of the end of the magnetic head element by the TPTP phenomenon, in which the vertical axis and the horizontal axis are assumed such the x-axis and y-axis, is called a TPTP profile. Besides, the overcoat layer 39, of course, protrudes, the it affects this TPTP profile, but the TPTP profile as shown in below is taken a measure that the end of the overcoat layer 39 does not become the lowest point, for example, by providing a appropriate recess part 80 on the trailing edge of the overcoat layer 39.

FIG. 9 shows a cross-sectional view showing a figure of the TPTP phenomenon emerged by a simulation.

According to this figure, it is found that the magnetic head element 32, that is to say, the end of the head end surface 300 of the MR effect element 33 and the electromagnetic coil element 34 protrudes by the thin-film magnetic head receiving the heat corresponding to the increase of the environment temperature. This protrusion is also comprehended as a projection near portion positioned the end of the magnetic head element 32 in the head end surface 300. Also, it is found that vicinity of the trailing edge also inclines to protrude with transformation of the whole magnetic head element 32 and the whole overcoat layer 39. Here, a figure of such projection of the head end surface 300 corresponds the TPTP profile.

Figure 10:
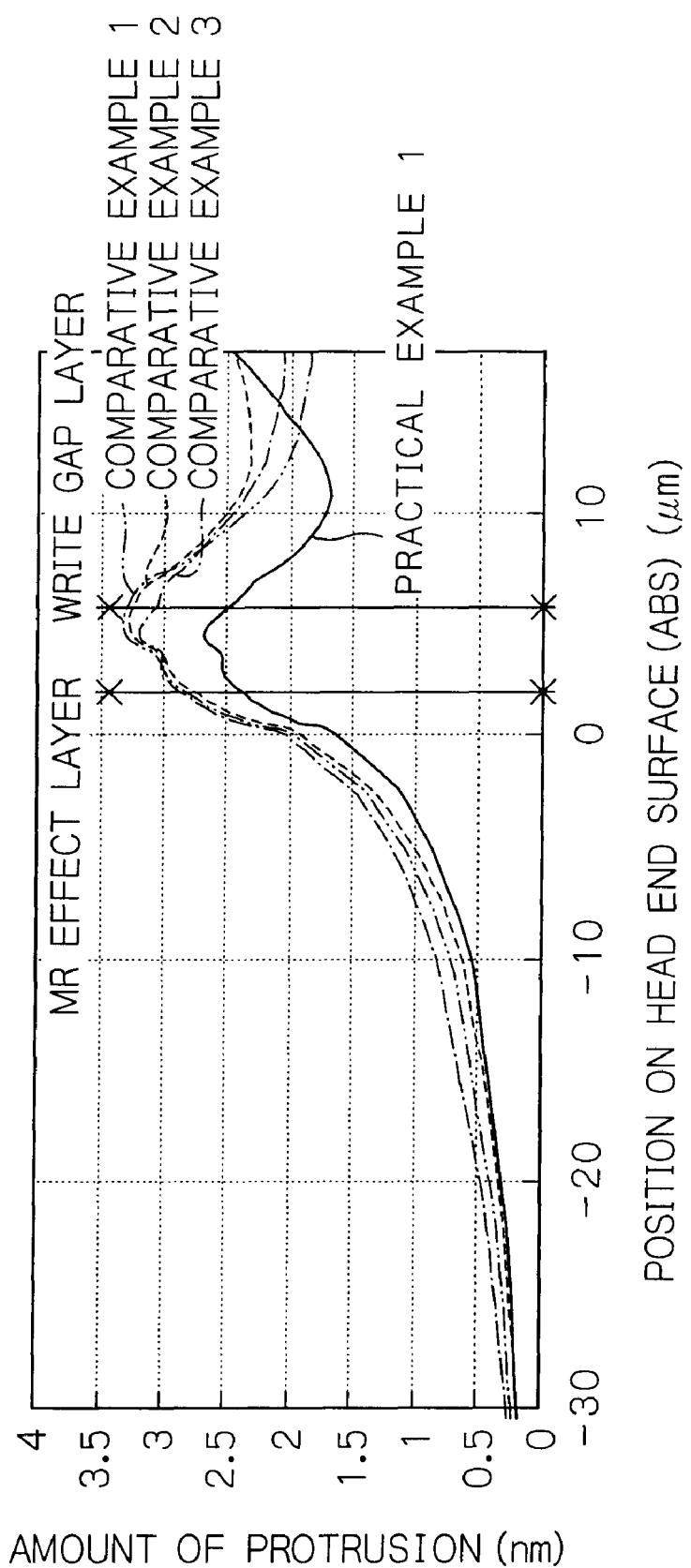
FIG. 10 shows a graph showing the TPTP profile according to the practical example and the comparative examples having the write coil-insulating layer whose size and Young's modulus are different.

FIG. 10 shows a graph showing the TPTP profile according to the practical example and the comparative examples having the write coil-insulating layer whose size and Young's modulus are different.

First, Table 1 shows each parameter of the write coil-insulating layer according to a head sample which is used in the simulation whose result is shown in FIG. 10.

TABLE 1

|  | $W_{CI}$(μm) × $L_{CI}$(μm) | Young's modulus $Y_{IN}$ (GPa) | Heat expansion coefficient $I_{IN}$ (/K) |
| --- | --- | --- | --- |
| Comparative example 1 | 60 × 30 | 0.1 | 90 × $10^{-6}$ |
| Comparative example 2 | 100 × 150 | 0.1 | 90 × $10^{-6}$ |
| Comparative example 3 | 60 × 30 | 1 | 90 × $10^{-6}$ |
| Practical example 1 | 100 × 150 | 1 | 90 × $10^{-6}$ |

According to Table 1, a width $W_{CI}$ of the write coil-insulating layer in only practical example 1 is 100 μm and is larger than 46 μm, and a length $L_{CI}$ is 150 μm and is larger than 75 μm, and the range of the Young's modulus is 1-4 GPa. Also, the heat expansion coefficient $I_{IN}$ is 90×$10^{-6}$ in any head samples.

According to FIG. 10, all the TPTP profile of the comparative examples 1-3 is similar and the maximum peak value of the protrusion between the MR effect multilayer position and the write gap layer position shows approximately 3.2-3.3 nm in any examples. Whereas in the TPTP profile of the practical example 1, this maximum peak value shows approximately 2.7 nm, it is understood that the TPTP phenomenon is sufficiently and surely suppressed. Consequently it is understood that the size of the write coil-insulating layer needs to regulate larger than the predetermined size in order to sufficiently and surely suppress the TPTP phenomenon.

Furthermore, according to FIG. 10, although the comparative example 2 has the write coil-insulating layer which has enough size as well as the practical example 1, the TPTP phenomenon has become larger than that of the practical example 1. Therefore, surely in order to suppress the TPTP phenomenon due to the environment temperature, it is understood that it is insufficient for the size of the write coil-insulating layer to regulate larger than the predetermined size, and that the Young's modulus of the write coil-insulating layer needs to regulate in predetermined range.

First, the regulation of the size of the write coil-insulating layer will be explained using FIG. 11 and FIG. 12.

Figure 11:
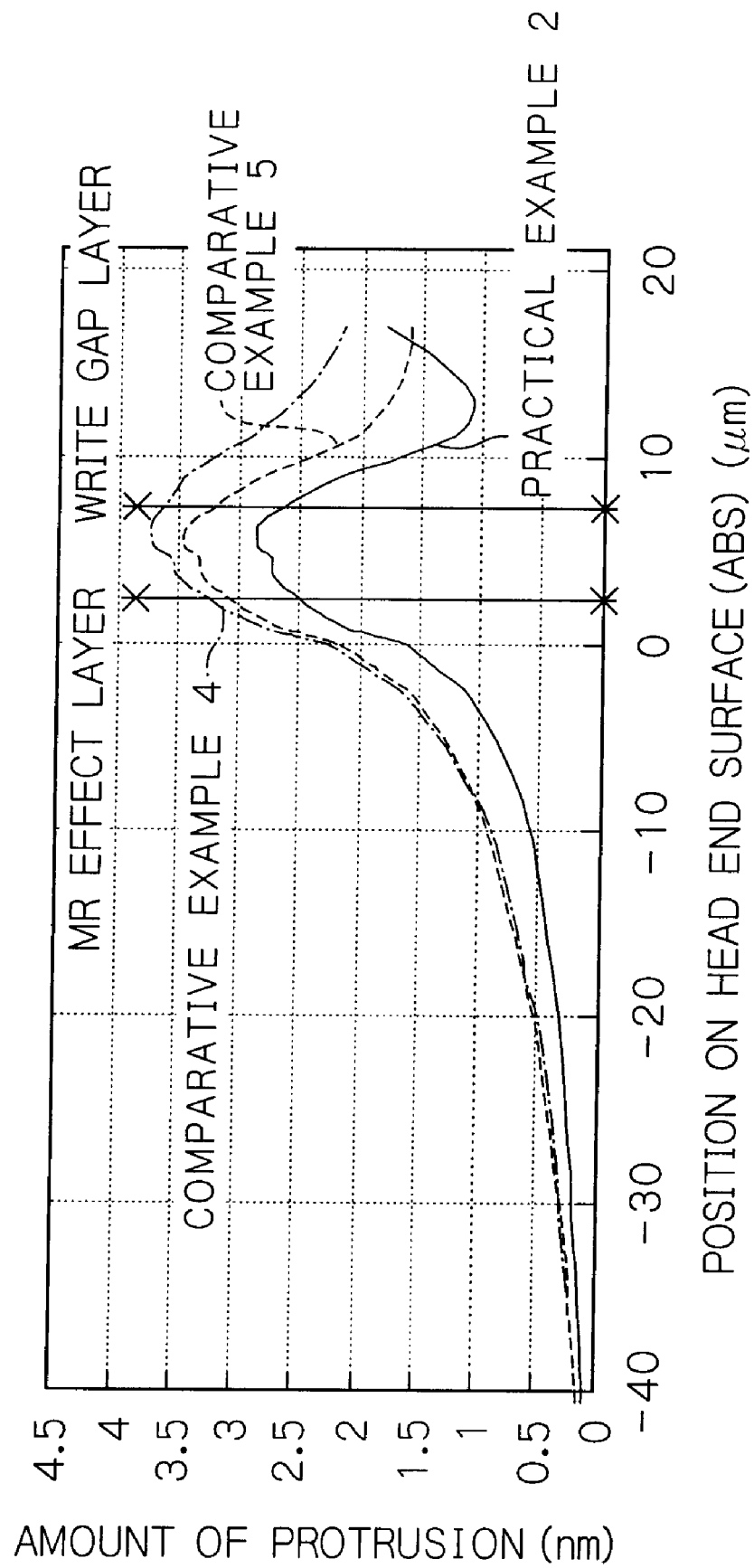
FIG. 11 shows a graph showing the TPTP profile according to the practical example and the comparative examples having the write coil-insulating layer whose size is different.

FIG. 11 shows a graph showing the TPTP profile according to the practical example and the comparative examples having the write coil-insulating layer whose size is different.

Table 2 shows each parameter of the write coil-insulating layer according to a head sample which is used in the simulation whose result is shown in FIG. 11.

TABLE 2

|  | $W_{CI}(\mu m) \times L_{CI}(\mu m)$ | Young's modulus $Y_{IN}$ (GPa) | Heat expansion coefficient $I_{IN}$ (/K) |
|---|---|---|---|
| Comparative example 4 | 60 × 30 | 1 | $90 \times 10^{-6}$ |
| Comparative example 5 | 100 × 30 | 1 | $90 \times 10^{-6}$ |
| Practical example 2 | 100 × 150 | 1 | $90 \times 10^{-6}$ |

According to Table 2, the Young's modulus $Y_{IN}$ and the heat expansion coefficient $I_{IN}$ are 1 GPa and $90 \times 10^{-6}$ in any head samples, respectively, but the size of the write coil-insulating layer is different from each sample. In comparative example 5, only the width $W_{CI}$ is the same size as that of the practical example 2.

According to FIG. 11, as the write coil-insulating layer becomes larger like the comparative example 4, the comparative example 5, and the practical example 2, the maximum peak value of the protrusion in the TPTP profile reduces increasingly. Consequently it is understood that the size of the write coil-insulating layer needs to have enough size as the practical example 2 sufficiently and surely in order to suppress the TPTP phenomenon.

Figure 12:
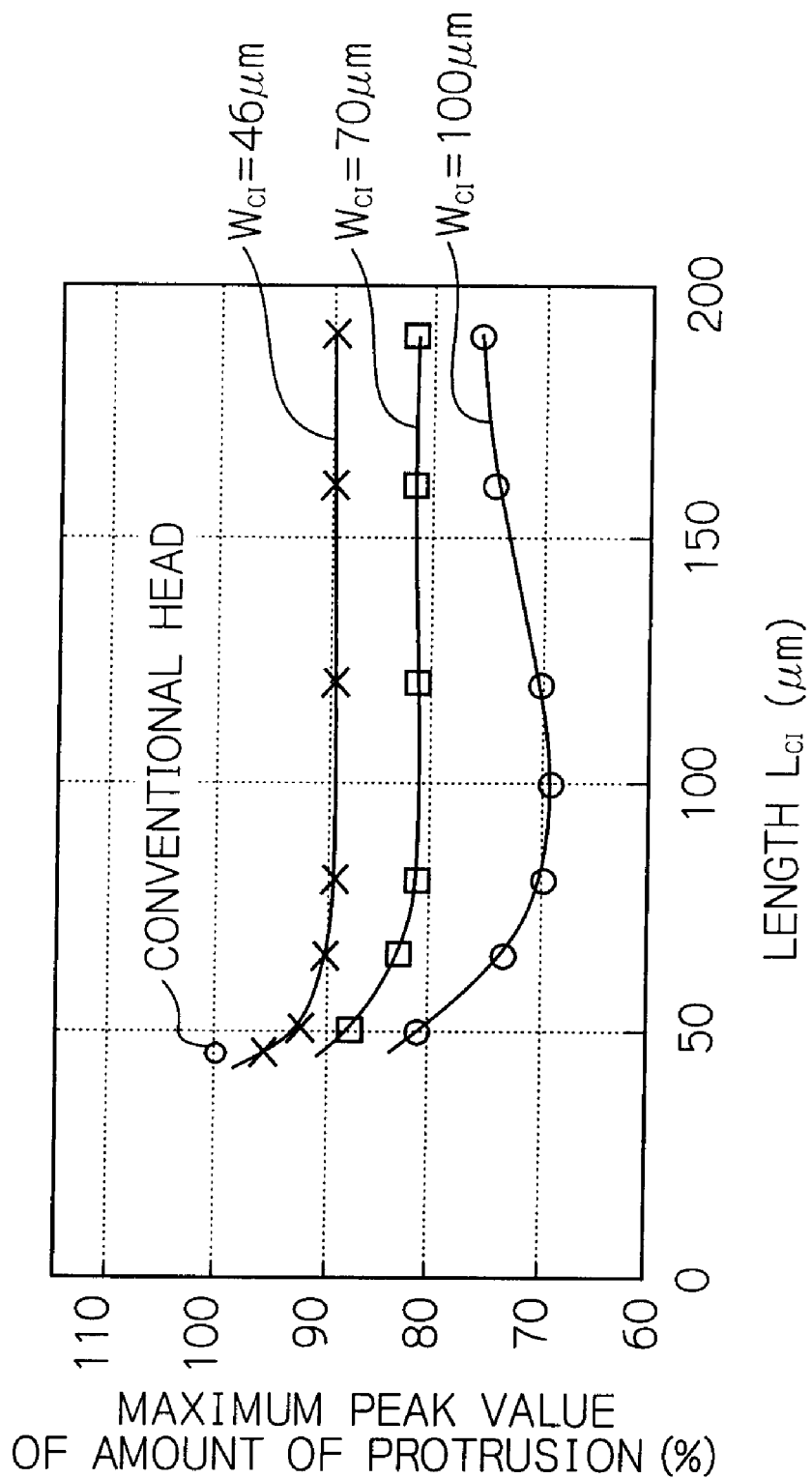
FIG. 12 shows a graph showing the maximum peak value of the protrusion according to the head samples having the write coil-insulating layers of various size.

FIG. 12 shows a graph showing the maximum peak value of the protrusion according to the head sample having the write coil-insulating layer of various sizes. FIG. 12 shows a relationship between the length $L_{CI}$ of the write coil insulating layer and the maximum peak value of the protrusion in each head sample having the write coil-insulating layer of the various width $W_{CI}$.

The Young's modulus $Y_{IN}$ is 1 GPa and heat expansion coefficient $I_{IN}$ is $90 \times 10^{-6}$ in any used head samples. Also, the maximum peak value of the protrusion which is a vertical axis of FIG. 12 becomes a regulation value when the maximum peak value of the protrusion is 100% in the conventional head, in which the size of the write coil-insulating layer is the width $W_{CI} \times$ the length $L_{CI} = 46 \mu m \times 45 \mu m$, the heat expansion coefficient $I_{IN}$ is $30 \times 10^{-6}$/K, and the Young's modulus $Y_{IN}$ is 6 Gpa.

According to FIG. 12, it is found that the maximum peak value of the protrusion is sufficiently and surely improved than that of the conventional head because the maximum peak value of the protrusion is widely and stably less then 100% which is the maximum peak value of the protrusion in the conventional head, in any head samples in which the width $W_{CI}$ of the write coil-insulating layer is 46 μm, 70 μm, or 100 μm if the length $L_{CI}$ becomes at least more than 75 μm beyond 50 μm. As respect the width $W_{CI}$ of the write coil-insulating layer, its value become larger as 46 μm, 70 μm, 100 μm, the peak of the protrusion is reduced, so it is found that the TPTP phenomenon is suppressed more, and it is found that the TPTP phenomenon is suppressed better than the previous head if the width $W_{CI}$ is at least 46 μm or more.

Consequently it is understood that it is very important that both of the length $L_{CI}$ and the width $W_{CI}$ of the write coil-insulating layer is set in regulated enough size or larger size than this size for sufficiently and surely suppressing the TPTP phenomenon. Of course the size of the write coil-insulating layer has an upper limit, then it is obvious that this must be put physically in an area on an element-formed surface of the slider substrate.

Next, the regulation of the heat expansion coefficient $I_{IN}$ and the Young's modulus $Y_{IN}$ will be explained using FIG. 13.

Figure 13:
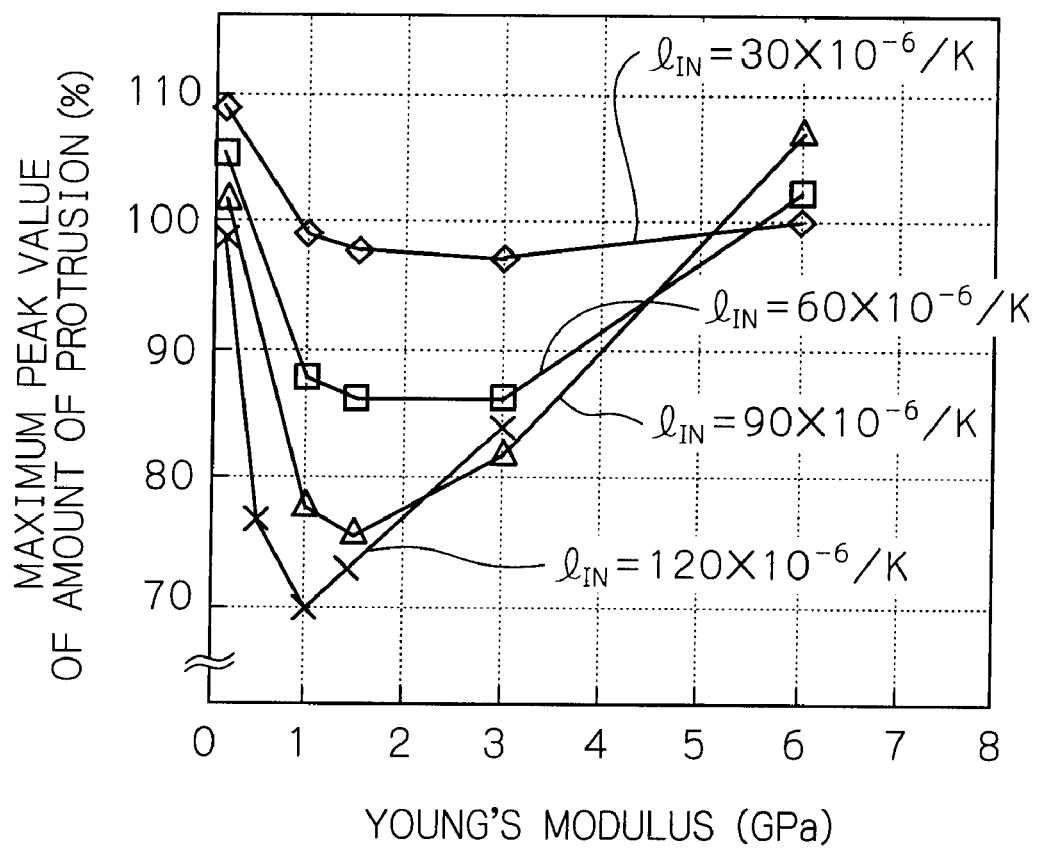
FIG. 13 shows a graph showing the maximum peak value of the protrusion according to the head samples having the various heat expansion coefficient $I_{IN}$ and the various Young's modulus $Y_{IN}$.

FIG. 13 shows a graph showing the maximum peak value of the protrusion according to the head samples having the various heat expansion coefficient IN and the various Young's modulus $Y_{IN}$.

The size of the write coil-insulating layer is the width $W_{CI} \times$ the length $L_{CI} = 100 \mu m \times 150 \mu m$ in any used head samples. Also, the maximum peak value of the protrusion which is a vertical axis of FIG. 13 becomes a regulation value when the maximum peak value of the protrusion is 100% in the conventional head, in which the heat expansion coefficient $I_{IN}$ is $30 \times 10^{-6}$/K, and the Young's modulus $Y_{IN}$ is 6 GPa.

According to FIG. 13, it is found that the maximum peak value of the protrusion is less than 100% and is improved than that of conventional head in the head sample in which expansion coefficient $I_{IN}$ is $30 \times 10^{-6}$/K if the Young's modulus $Y_{IN}$ is larger than or equal to 1 GPa and smaller than or equal to 4 GPa. Whereas, in the case where the Young's modulus $Y_{IN}$ is out of this range, the maximum peak value is almost 100% or more, then the suppression of the TPTP phenomenon is hardly seen. And it is found that the maximum peak value of the protrusion increases suddenly in each head sample in which the heat expansion coefficient $I_{IN}$ is 60, 90, or $120 \times 10^{-6}$/K, when the Young's modulus $Y_{IN}$ becomes smaller than 1 GPa.

Further, it is found that the maximum peak value of the protrusion is surely less than 100% and is widely improved than that of conventional head in the head sample, in which the heat expansion coefficient $I_{IN}$ is larger than or equal to $60 \times 10^{-6}$/K if the Young's modulus $Y_{IN}$ is larger than or equal to 1 GPa and smaller than or equal to 4 GPa.

As a result showing FIGS. 10-13, in the coil-insulating layer that the width $W_{CI}$ of the track-width direction is larger than a width $W_C$ that is a minimum size to need to insulate the whole coil insulating layer and is at least equal to or larger than 46 μm, and the length $L_{CI}$ of the direction perpendicular to the track-width direction is larger than a length $L_C$ that is a minimum length to need to insulate the whole coil insulating layer and is at least equal to or larger than 75 μm, it is found that the TPTP phenomenon due to the environment temperature is sufficiently and surely suppressed if the heat expansion coefficient $I_{IN}$ is larger than or equal to $30 \times 10^{-6}$/K and the Young's modulus $Y_{IN}$ is larger than or equal to 1 GPa and smaller than or equal to 4 GPa. Furthermore, it is found that the TPTP phenomenon due to the environment temperature is more sufficiently and surely suppressed if the heat expansion coefficient $I_{IN}$ of the coil-insulating layer is larger than or equal to $60 \times 10^{-6}$/K All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:
1. A thin-film magnetic head comprising:
   an electromagnetic coil element for writing data including a coil layer which generates a magnetic field by current flowing through the coil layer and a coil-insulating layer which surrounds the coil layer; and
   an overcoat layer which covers the electromagnetic coil element, a width in a track-width direction of the coil-insulating layer being larger than a width that is a minimum width needed to insulate the whole coil layer, and being at least 46 μm,
a length in a direction perpendicular to the track-width direction of the coil-insulating layer being larger than a length that is a minimum length needed to insulate the whole coil layer, and being at least 75 μm,
a heat expansion coefficient of the coil-insulating layer being larger than or equal to $30 \times 10^{-6}$/K,
a Young's modulus of the coil-insulating layer being larger than or equal to 1 GPa and smaller than or equal to 4 GPa, and
the length of the coil-insulating layer is greater than the width of the coil-insulating layer.

2. The thin-film magnetic head as claimed in claim 1, wherein the heat expansion coefficient of said coil-insulating layer is larger than or equal to $60 \times 10^{-6}$/K.

3. The thin-film magnetic head as claimed in claim 1, wherein said coil layer has a two layered structure, and said coil-insulating layer has a two layered structure.

4. The thin-film magnetic head as claimed in claim 1, wherein
said electromagnetic coil element further includes
a lower magnetic pole layer, and
an upper magnetic pole layer which sandwiches a write gap layer with said lower magnetic pole layer on an end portion on an air bearing surface side;
said coil layer is a write coil layer passing between said lower magnetic pole layer and said upper magnetic pole layer, the write coil layer generates a write magnetic field; and
said coil-insulating layer is a write coil-insulating layer which surrounds said write coil layer.

5. The thin-film magnetic head as claimed in claim 1, wherein
said electromagnetic coil element further includes
a main magnetic pole layer,
an auxiliary magnetic pole layer having an end on an air bearing surface side opposed to an end on the air bearing surface side of the main magnetic pole layer via a gap layer,
a backing coil layer formed on an area except the area between said main magnetic pole layer and said auxiliary magnetic pole layer, the backing coil layer having a coil surface parallel to a coil surface of a write coil layer, and
a backing coil-insulating layer which surrounds said backing coil layer;
said coil layer is the write coil layer which passes between said main magnetic pole layer and said auxiliary magnetic pole layer, the write coil layer generates a write magnetic field; and
said coil-insulating layer is a write coil-insulating layer which surrounds said write coil layer.

6. The thin-film magnetic head as claimed in claim 1, wherein
said electromagnetic coil element further includes
a main magnetic pole layer,
an auxiliary magnetic pole layer having an end on an air bearing surface side opposed to an end on the air bearing surface side of the main magnetic pole layer via a gap layer,
a write coil layer passing between said main magnetic pole layer and said auxiliary magnetic pole layer, the write coil layer generates a write magnetic field, and
a write coil-insulating layer which surrounds said write coil layer;
said coil layer is a backing coil layer formed on an area except the area between said main magnetic pole layer and said auxiliary magnetic pole layer, the backing coil layer having a coil surface parallel to a coil surface of a write coil layer; and
said coil-insulating layer is a backing coil-insulating layer which surrounds said backing coil layer.

7. The thin-film magnetic head as claimed in claim 1, further comprising: at least one heating portion for protruding an end on an air bearing surface side of said electromagnetic coil element toward a magnetic recording medium by a heat expansion.

8. The thin-film magnetic head as claimed in claim 7, further comprising: a magnetoresistive effect element for reading data, said heating portion being set between said magnetoresistive effect element and said electromagnetic coil element.

9. A head gimbal assembly comprising:
a thin-film magnetic head including:
an electromagnetic coil element for writing data including a coil layer which generates a magnetic field by current flowing through the coil layer and a coil-insulating layer which surrounds the coil layer; and
an overcoat layer which covers the electromagnetic coil element,
a width in a track-width direction of the coil-insulating layer being larger than a width that is a minimum width needed to insulate the whole coil layer, and being at least 46 μm,
a length in a direction perpendicular to the track-width direction of the coil-insulating layer being larger than a length that is a minimum length needed to insulate the whole coil layer, and being at least 75 μm,
a heat expansion coefficient of the coil-insulating layer being larger than or equal to $30 \times 10^{-6}$/K,
a Young's modulus of the coil-insulating layer being larger than or equal to 1 GPa and smaller than or equal to 4 GPa, and
the length of the coil-insulating layer being greater than the width of the coil-insulating layer; and
a support mechanism for supporting said thin-film magnetic head.

10. The head gimbal assembly as claimed in claim 9, wherein said heat expansion coefficient of said coil-insulating layer is larger than or equal to $60 \times 10^{-6}$/K.

11. The head gimbal assembly as claimed in claim 9, wherein said coil layer has a two layered structure, and said coil-insulating layer has a two layered structure.

12. The head gimbal assembly as claimed in claim 9, wherein
said electromagnetic coil element further includes
a lower magnetic pole layer, and
an upper magnetic pole layer which sandwiches a write gap layer with said lower magnetic pole layer on an end portion on an air bearing surface side;
said coil layer is a write coil layer passing between said lower magnetic pole layer and said upper magnetic pole layer, the write coil layer generates a write magnetic field; and
said coil-insulating layer is a write coil-insulating layer which surrounds said write coil layer.

13. The head gimbal assembly as claimed in claim 9, wherein
said electromagnetic coil element further includes
a main magnetic pole layer, an auxiliary magnetic pole layer having an end on an air bearing surface side opposed to an end on the air bearing surface side of the main magnetic pole layer via a gap layer, a backing coil layer formed on an area except the area between said main magnetic pole layer and said auxiliary magnetic pole layer, the backing coil layer having a coil surface parallel to a coil surface of a write coil layer, and a backing coil-insulating layer which surrounds said backing coil layer;

said coil layer is the write coil layer which passes between said main magnetic pole layer and said auxiliary magnetic pole layer, the write coil layer generates a write magnetic field; and said coil-insulating layer is a write coil-insulating layer which surrounds said write coil layer.

14. The head gimbal assembly as claimed in claim 9, wherein
said magnetic coil element further includes
a main magnetic pole layer,
an auxiliary magnetic pole layer having an end on an air bearing surface side opposed to an end on the air bearing surface side of the main magnetic pole layer via a gap layer,
a write coil layer passing between said main magnetic pole layer and said auxiliary magnetic pole layer, the write coil layer generates a write magnetic field, and
a write coil-insulating layer which surrounds said write coil layer;
said coil layer is a backing coil layer formed on an area except the area between said main magnetic pole layer and said auxiliary magnetic pole layer, the backing coil layer having a coil surface parallel to a coil surface of said write coil layer; and
said coil-insulating layer is a backing coil-insulating layer which surrounds said backing coil layer.

15. The head gimbal assembly as claimed in claim 9, wherein said thin-film magnetic head further comprises at least one heating portion for protruding an end on an air bearing surface side of said electromagnetic coil element toward a magnetic recording medium by a heat expansion.

16. The head gimbal assembly as claimed in claim 15, wherein said thin-film magnetic head further comprises a magnetoresistive effect element for reading data, said heating portion being set between said magnetoresistive effect element and said electromagnetic coil element.

17. A magnetic disk drive apparatus comprising:
at least one head gimbal assembly including:
a thin-film magnetic head including:
an electromagnetic coil element for writing data including a coil layer which generates a magnetic field by current flowing through the coil layer and a coil-insulating layer which surrounds the coil layer; and
an overcoat layer which covers the electromagnetic coil element,
a width in a track-width direction of the coil-insulating layer being larger than a width that is a minimum width needed to insulate the whole coil layer, and being at least 46 μm,
a length in a direction perpendicular to the track-width direction of the coil-insulating layer being larger than a length that is a minimum length needed to insulate the whole coil layer, and being at least 75 μm,
a heat expansion coefficient of the coil-insulating layer being larger than or equal to $30 \times 10^{-6}$/K,
a Young's modulus of the coil-insulating layer being larger than or equal to 1 GPa and smaller than or equal to 4 GPa, and
the length of the coil-insulating layer being greater than the width of the coil-insulating layer; and
a support mechanism for supporting said thin-film magnetic head;
at least one magnetic recording medium;
a recording/reproducing control circuit for controlling read and write operations of said thin-film magnetic head toward said at least one magnetic recording medium; and
a heating control circuit for controlling a heat operation of a heating portion in the case where said thin-film magnetic head includes said at least one heating portion.

18. A magnetic disk drive apparatus as claimed in claim 17, wherein said heat expansion coefficient of said coil-insulating layer is larger than or equal to $60 \times 10^{-6}$/K.

19. A magnetic disk drive apparatus as claimed in claim 17, wherein said coil layer has a two layered structure, and said coil-insulating layer has a two layered structure.

20. A magnetic disk drive apparatus as claimed in claim 17, wherein
said electromagnetic coil element further includes
a lower magnetic pole layer, and
an upper magnetic pole layer which sandwiches a write gap layer with said lower magnetic pole layer on an end portion on an air bearing surface side;
said coil layer is a write coil layer passing between said lower magnetic pole layer and said upper magnetic pole layer, the write coil layer generates a write magnetic field; and
said coil-insulating layer is a write coil-insulating layer which surrounds said write coil layer.

21. A magnetic disk drive apparatus as claimed in claim 17, wherein
said electromagnetic coil element further includes
a main magnetic pole layer,
an auxiliary magnetic pole layer having an end on an air bearing surface side opposed to an end on the air bearing surface side of the main magnetic pole layer via a gap layer,
a backing coil layer formed on an area except the area between said main magnetic pole layer and said auxiliary magnetic pole layer, the backing coil layer having a coil surface parallel to a coil surface of a write coil layer, and
a backing coil-insulating layer which surrounds said backing coil layer;
said coil layer is the write coil layer which passes between said main magnetic pole layer and said auxiliary magnetic pole layer, the write coil layer generates a write magnetic field; and
said coil-insulating layer is a write coil-insulating layer which surrounds said write coil layer.

22. A magnetic disk drive apparatus as claimed in claim 17, wherein
said electromagnetic coil element further includes
a main magnetic pole layer,
an auxiliary magnetic pole layer having an end on an air bearing surface side opposed to an end on the air bearing surface side of the main magnetic pole layer via a gap layer, a write coil layer passing between said main magnetic pole layer and said auxiliary magnetic pole layer, the write coil layer generates a write magnetic field, and
a write coil-insulating layer which surrounds said write coil layer;
said coil layer is a backing coil layer formed on an area except the area between said main magnetic pole layer and said auxiliary magnetic pole layer, the backing coil layer having a coil surface parallel to a coil surface of said write coil layer; and
said coil-insulating layer is a backing coil-insulating layer which surrounds said backing coil layer.

23. A magnetic disk drive apparatus as claimed in claim 17, wherein said thin-film magnetic head further comprises at least one heating portion for protruding an end on an air bearing surface side of said electromagnetic coil element toward a magnetic recording medium by a heat expansion.

24. A magnetic disk drive apparatus as claimed in claim 23, wherein said thin-film magnetic head further comprises a magnetoresistive effect element for reading data, said heating portion being set between said magnetoresistive effect element and said electromagnetic coil element.

* * * * *